(12) United States Patent
Tam et al.

(10) Patent No.: US 10,505,838 B2
(45) Date of Patent: Dec. 10, 2019

(54) SYSTEM AND METHOD FOR DIVERTING ESTABLISHED COMMUNICATION SESSIONS

(71) Applicant: SANDVINE INCORPORATED ULC, Waterloo (CA)

(72) Inventors: Adrian Tam, Mississauga (CA); David Cameron Dolson, Waterloo (CA); Jeffery James Weeks, Wellesley (CA)

(73) Assignee: SANDVINE CORPORATION, Vancouver, BC (CA)

( * ) Notice: Subject to any disclaimer, the term of this patent is extended or adjusted under 35 U.S.C. 154(b) by 0 days.

(21) Appl. No.: 14/562,984

(22) Filed: Dec. 8, 2014

(65) Prior Publication Data
US 2015/0180767 A1 Jun. 25, 2015

Related U.S. Application Data

(60) Provisional application No. 61/918,204, filed on Dec. 19, 2013.

(51) Int. Cl.
*H04L 29/08* (2006.01)
*H04L 12/801* (2013.01)
(Continued)

(52) U.S. Cl.
CPC ............ *H04L 45/22* (2013.01); *H04L 45/123* (2013.01); *H04L 47/10* (2013.01); *H04L 47/36* (2013.01)

(58) Field of Classification Search
CPC ... H04L 45/742; H04L 67/1002; H04L 67/14; H04L 67/327
(Continued)

(56) References Cited

U.S. PATENT DOCUMENTS

| | | | | |
|---|---|---|---|---|
| 7,996,556 B2* | 8/2011 | Raghavan | ............... | G06F 9/546 709/237 |
| 8,085,775 B1* | 12/2011 | Pappu | ................. | H04L 47/2441 370/392 |

(Continued)

OTHER PUBLICATIONS

Boucadair, M., et al., "Differentiated Service Function Chaining Framework; draft-boucadair-network-function-chaining-03.txt", Internet Engineering Task Force, IETF; Standard Working Draft, Internet Society (ISOC) 4, Rue Des Falaises CH-1205, Geneva, Switzerland, Aug. 21, 2013, pp. 1-22, XP015093513.

(Continued)

*Primary Examiner* — Asad M Nawaz
*Assistant Examiner* — Jason A Harley
(74) *Attorney, Agent, or Firm* — Gowling WLG (Canada) LLP; Neil W. Henderson

(57) ABSTRACT

There is provided a system and method for diverting established communication sessions, which includes: receiving at least one packet from a communication session; determining the state of the communication session; if the state of the communication session is diverted, bridging the at least one packet to a service chain; if the state of the communication session has been prohibited from being diverted, forwarding the at least one packet to an endpoint; and otherwise, if the state of the communication session is a state prior to the divert decision, saving the at least one packet and determining whether the communication session is a candidate to be diverted to the service chain.

18 Claims, 31 Drawing Sheets

(51) Int. Cl.
*H04L 12/751* (2013.01)
*H04L 12/721* (2013.01)
*H04W 28/02* (2009.01)
*H04L 12/707* (2013.01)
*H04L 12/805* (2013.01)

(58) Field of Classification Search
USPC .......................................................... 709/227
See application file for complete search history.

(56) References Cited

U.S. PATENT DOCUMENTS

| | | | | |
|---|---|---|---|---|
| 2004/0193714 | A1* | 9/2004 | Bowman | H04L 45/742 709/227 |
| 2006/0123477 | A1* | 6/2006 | Raghavan | G06F 9/546 726/22 |
| 2007/0027974 | A1* | 2/2007 | Lee | H04L 41/0681 709/223 |
| 2007/0156919 | A1* | 7/2007 | Potti | G06F 8/656 709/238 |
| 2007/0195797 | A1* | 8/2007 | Patel | H04J 3/0685 370/400 |
| 2010/0260177 | A1* | 10/2010 | Wu | H04L 45/00 370/389 |
| 2013/0272305 | A1 | 10/2013 | Lefebvre et al. | |
| 2014/0341029 | A1* | 11/2014 | Allan | H04L 47/125 370/235 |
| 2015/0011182 | A1* | 1/2015 | Goldner | H04M 15/66 455/406 |
| 2015/0085870 | A1* | 3/2015 | Narasimha | H04L 49/70 370/409 |
| 2015/0138973 | A1* | 5/2015 | Kumar | H04L 45/12 370/235 |
| 2015/0180767 | A1* | 6/2015 | Tam | H04L 47/10 370/389 |
| 2015/0334027 | A1* | 11/2015 | Bosch | H04L 45/38 370/230 |
| 2015/0358235 | A1* | 12/2015 | Zhang | H04L 45/745 370/230 |

OTHER PUBLICATIONS

European Patent Office, Extended European Search Report for European Patent Appln. 14197246.3, dated Jun. 8, 2015.

* cited by examiner

|  | Packet 1 | Packet 2 | Packet 3 |
|---|---|---|---|
| Original L5 Sequence | 0 | 60 | 140 |
| Original L5 Length | 120 | 80 | 10 |
| L3 + L4 header Length | 40 | 40 | 40 |
| tcp_stream_data_node | Layer5_offset: 40 +0<br>Layer5_length: 120 | Layer5_offset:40 + 60<br>Layer5_length: 20 | Layer5_offset: 40 + 0<br>Layer5_length: 10 |

FIG. 24

SYSTEM AND METHOD FOR DIVERTING ESTABLISHED COMMUNICATION SESSIONS

CROSS REFERENCE TO RELATED APPLICATIONS

This application claims the benefit of priority of U.S. Provisional Patent Application No. 61/918,204, filed Dec. 19, 2013, which is herein incorporated by reference in its entirety.

FIELD

The present disclosure relates generally to computer networks. More particularly, the present disclosure relates to a system and method for diverting established communication sessions.

BACKGROUND

In a data communications network it is sometimes desirable to divert data to a destination other than the destination addressed by an initiator. One common example is that of Internet web page caching, in which a request for web content may be directed to a geographically local server containing the same content rather than to the server addressed by the initiator. This is intended to reduce the communication fees, time and network resource use.

Another example is that of peer-to-peer optimization, in which a request for a particular file is directed to a geographically local peer known to have the file. This optimization is intended to reduce the communication fees. For example, the redirection of requests to reduce communication fees in a Peer to Peer network (P2P) is disclosed in U.S. Pat. No. 7,571,251.

In conventional solutions for diverting data flows, the identification/determination of what data flows or network traffic to divert has generally been based on the designated port number of the data flow. The port number is found in Transmission Communication Protocol (TCP) and User Datagram Protocol (UDP) packets. For example, Internet web caching has typically been done simply by forwarding all traffic destined for TCP port 80 to the appropriate cache. Since all packets including the very first are diverted, there is never any contact with the intended destination. However, there may also be situations where it is necessary to divert data flows or traffic even after initial contact with an intended destination.

One further example of diverting traffic, relates to systems in which Internet Service Providers (ISP) delivering internet access may selectively pass traffic through specialized devices for the ISP's subscribers or customers, which may provide services, for example, firewall services, parental controls, or the like. The traffic path passing through these services is frequently referred to as a "service chain". The ability to selectively provide these services by varying the service chains allows ISPs to differentiate themselves and/or receive additional revenue.

It is, therefore, desirable to provide an improved system and method for diverting and routing established communication sessions.

SUMMARY

In one aspect herein, there is provided a method for diverting established communication sessions including: receiving at least one packet from a communication session; determining the state of the communication session; if the state of the communication session is diverted, bridging the at least one packet to a service chain; if the state of the communication session has been prohibited from being diverted, forwarding the at least one packet to an endpoint; and otherwise, if the state of the communication session is a state prior to the divert decision, saving the at least one packet and determining whether the communication session is a candidate to be diverted to the service chain.

In a particular case, determining whether the communication session is a candidate to be diverted to the service chain includes: establishing a connection with the service chain; sending the at least one saved packet to the service chain; determining whether at least one packet received as a response from the service chain has been modified when compared to the at least one saved packets from the communication session; if the at least one response packet has been modified, prohibiting the communication session from being diverted; and if the at least one response packet has not been modified, diverting the communication session to the service chain.

In another case, receiving the at least one packet includes receiving initial set-up packets for the communication session as well as at least one data packet related to the communication session.

In yet another case, the communication session is a UDP communication session.

In yet another case, the communication session is a TCP communication session.

In a further case, the method further includes: determining whether the at least one packet from the communication session has a timestamp option enabled; if the timestamp option is enabled, saving a timestamp value and associating the timestamp value to an endpoint; and mapping a timestamp for the at least one packet received from the service chain to an associated timestamp value of the associated endpoint.

In yet another case, the method further includes: determining a maximum frame size of the service chain; determining a frame size of the at least one packet; and if the frame size of the at least one packet is greater than the maximum frame size, fragmenting the at least one packet prior to bridging the packet to the service chain.

In yet another case, the method further includes: establishing a timeout timer with a predetermined threshold timeout time; starting the timeout timer after sending the at least one packet to the service chain; determining whether a response is received from the service chain prior to the timer reaching the predetermined threshold timeout time; and if no response is received, ending the connection to the service chain and prohibiting the communication session from being diverted.

In yet another case, diverting the communication session to the service chain further includes ending the communication session with an endpoint.

In yet another case, the method further includes determining a maximum frame size of the service chain; determining a frame size of the at least one packet; and if the frame size of the at least one packet is greater than the maximum frame size, fragmenting the at least one packet prior to bridging the packet to the service chain.

In another aspect, there is provided a system for diverting established communication sessions including: a network interface configured to receive at least one packet from a communication session; a packet parsing module configured to determine the state of the communication session; a divert chain manager configured to bridge the at least one packet to a service chain if the state of the communication session is diverted, bridging the at least one packet to a service chain; a fast path module configured to forward the at least one packet to an endpoint, if the state of the communication session has been prohibited from being diverted, forwarding the at least one packet to an endpoint; and a protocol recognition state storage configured to save the at least one packet and determining whether the communication session is a candidate to be diverted to the service chain, if the state of the communication session is a state prior to the divert decision.

In a particular case, the divert chain manager is further configured to: establish a connection with the service chain; send the at least one saved packet to the service chain; determine whether at least one packet received as a response from the service chain has been modified when compared to the at least one saved packets from the communication session; if the at least one response packet has been modified, prohibit the communication session from being diverted; and if the at least one response packet has not been modified, divert the communication session to the service chain.

In another case, the network interface is further configured to receive the at least one packet includes receiving initial set-up packets for the communication session as well as at least one data packet related to the communication session.

In yet another case, the communication session is a UDP communication session.

In yet another case, the communication session is a TCP communication session.

In a further case, the divert chain manager is further configured to: determine whether the at least one packet from the communication session has a timestamp option enabled; if the timestamp option is enabled, save a timestamp value and associating the timestamp value to an endpoint; and map a timestamp for the at least one packet received from the service chain to an associated timestamp value of the associated endpoint.

In yet another case, the divert chain manager is further configured to: establish a timeout timer with a predetermined threshold timeout time; start the timeout timer after sending the at least one packet to the service chain; determine whether a response is received from the service chain prior to the timer reaching the predetermined threshold timeout time; and if no response is received, end the connection to the service chain and prohibiting the communication session from being diverted.

In yet another case, the divert chain manager is further configured to end the communication session with an endpoint.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 24 illustrates an example of overlapping packets;

DETAILED DESCRIPTION

Generally, the present disclosure provides embodiments of a method and system for diverting an established communication session. Initial data exchange and initial set-up will be completed by an initiator and acceptor and monitored by the system. Data packets may then be transferred between the initiator, for example, a client, a subscriber, a server or the like, and an acceptor, for example, a client, a subscriber, a server or the like. The system may monitor the established connection and determine, after data packets or content have been transferred, that the communication session is a candidate to be diverted. The system may then establish a connection with a network service component, for example a divert host, and replay the communication exchange that has occurred between the initiator and acceptor with the divert host. If the system determines that none of the content sent by the initiator and the acceptor has been modified by the divert host, the system may divert the established communication session. If the system determines that the data has been modified, the data may allow the communication session to proceed between the acceptor and the initiator.

In diverting a communication session already in progress, the following should be considered:

1) In order to identify some protocols it may be necessary to look at the initial data sent by the acceptor that was contacted. In other protocols, initial setup data from more than one data packet (possibly in both directions) may be analyzed. Therefore a decision to divert sometimes cannot be made without allowing an initial set-up of a connection to complete.

2) A challenge with TCP communication sessions is that the content is not usually transmitted until the third or fourth data packet of the communication session arrives after communication setup.

3) It may be undesirable to divert communication sessions that are not of a recognized protocol. Allowing initial set-up of connections for all communication sessions to complete before diverting selected protocols normally means that there is no impact on communication sessions of other protocols. Furthermore, it may not be necessary to perform full proxy on communication sessions that are not of interest.

4) If a session is already in progress, it is known that both nodes of the communication session are in a healthy state, the state may not be known if the targeted node is not used.

The system for diverting established communication sessions is configured to be placed within a data communications network. In an embodiment, the system would reside in a point through which all communication sessions to be analyzed pass.

Figure 1:
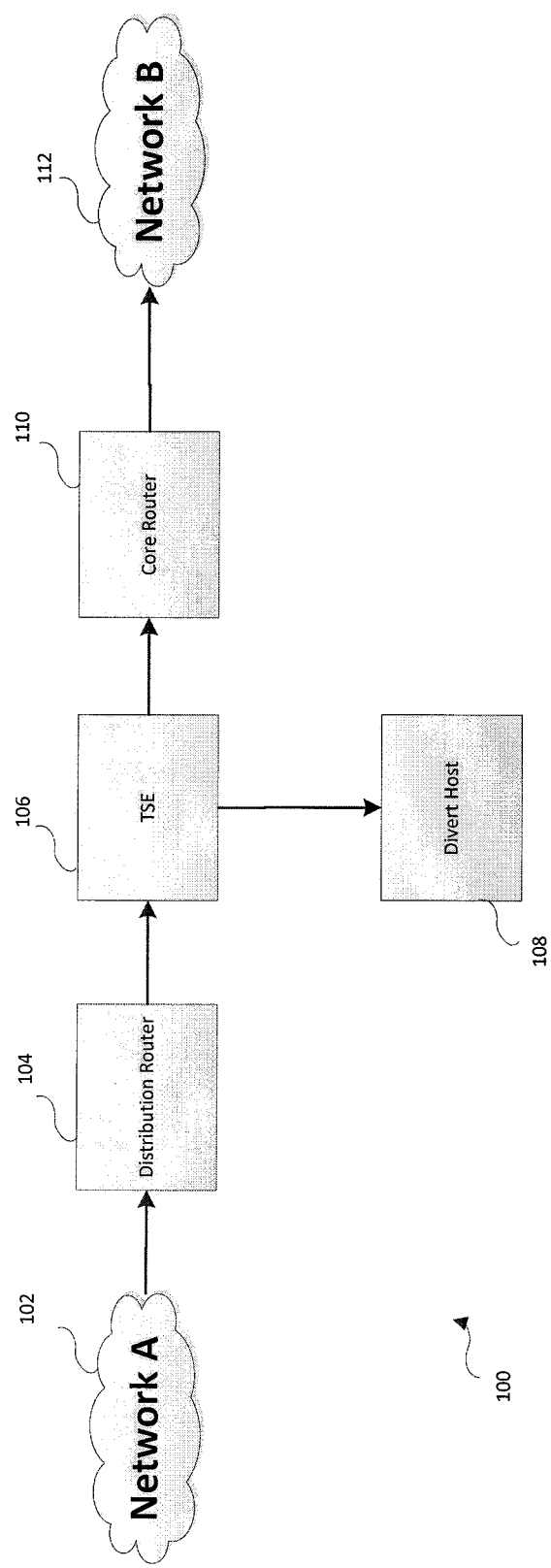
FIG. 1 is a block diagram of an embodiment of a system for diverting communication systems.

Referring now to FIG. 1, a diagram of a system 100 for diverting established communication sessions is shown. By way of example, system 100 is shown routing packets from an initiator (not shown) in Network A 102 to either an acceptor (not shown) in Network B or a divert host 108. FIG. 1 serves only as an example of one configuration. The initiator may reside in Network A 102 or Network B 112. Further the initiator, acceptor and divert host 108 may all reside in the same network. The point is the node on each end of the communication session may be on opposite sides of the TSE and may be located anywhere.

In the example of FIG. 1, a distribution router 104 receives packets from the initiator in Network A 102 and transmits them either to Traffic Switching Element (TSE) 106 or divert host 108. TSE 106 examines the communications stream from the distribution router 104 and either initiates a new communication session to the divert host 108 or passes it on to core router 110. When TSE 106 initiates a new communication session to the divert host 108 it also splices into that session all packets, save for the initial connection packets, which it has received to date. The present disclosure refers to this action as splicing as it effectively splices the communication stream from an initiator, or an acceptor or perhaps both, to divert host 108. In the case of splicing an initiator, the divert host 108 replaces an acceptor. In the case of splicing an acceptor, the divert host replaces an initiator. In the case of both, the divert host replaces both initiator and acceptor.

Divert host 108 is designed to accept connections addressed to any host on information provided by TSE 106 to determine which protocol to process. In the present system encapsulation may be accomplished by using, but is not limited to the use of: Virtual Local Area Network tagging (VLAN, IEEE 802.1q), Multilabel Protocol Switching (MPLS), and Generic Routing Encapsulation (GRE, Network Working Group RFC 2784).

In this example, Core router 110 passes the packets in the communication session to a node acting as an acceptor in Network B 112.

Figure 2:
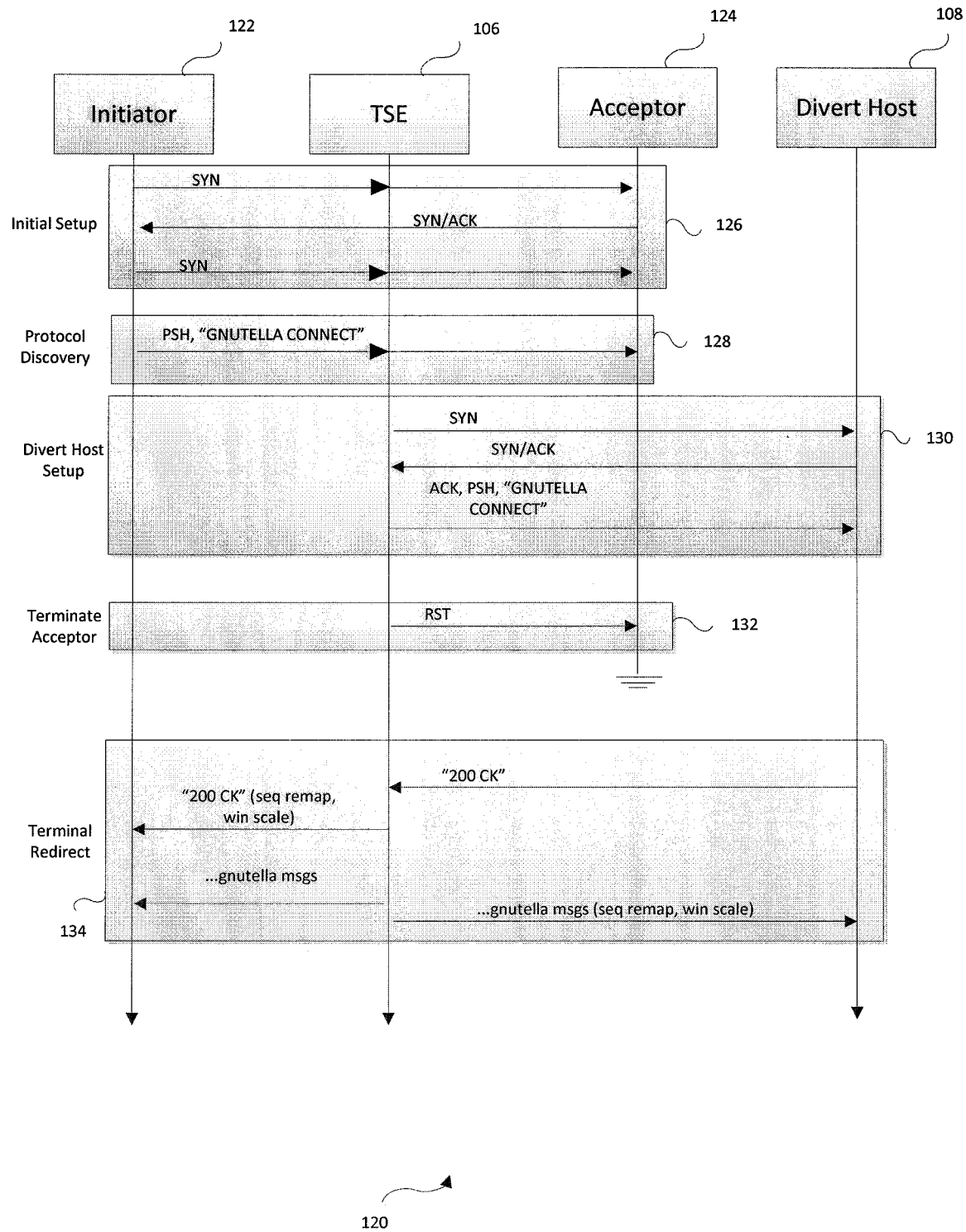
FIG. 2 is communications flow diagram illustrating diversion of a TCP communication session based upon content sent by an initiator.

Referring now to FIG. 2, a communications flow diagram illustrating diversion of a TCP communication session based upon content sent by an initiator is shown generally as 120. At initial setup 126, initiator 122 attempts to establish a communication session with acceptor 124. TSE 106 monitors this attempt. By way of example, protocol discovery 128 identifies a packet containing a signature of "GNU-TELLA CONNECT" in the first packet sent by initiator 122. This signature is one of many possible signatures that could be matched. After recognizing this signature TSE 106 duplicates the initiation connection messages to divert host 108 through divert host setup 130. Terminate acceptor 132 then closes the connection to acceptor 124. Finally, terminal redirect 134 joins initiator 122 to divert host 108, forming the splice.

Figure 3:
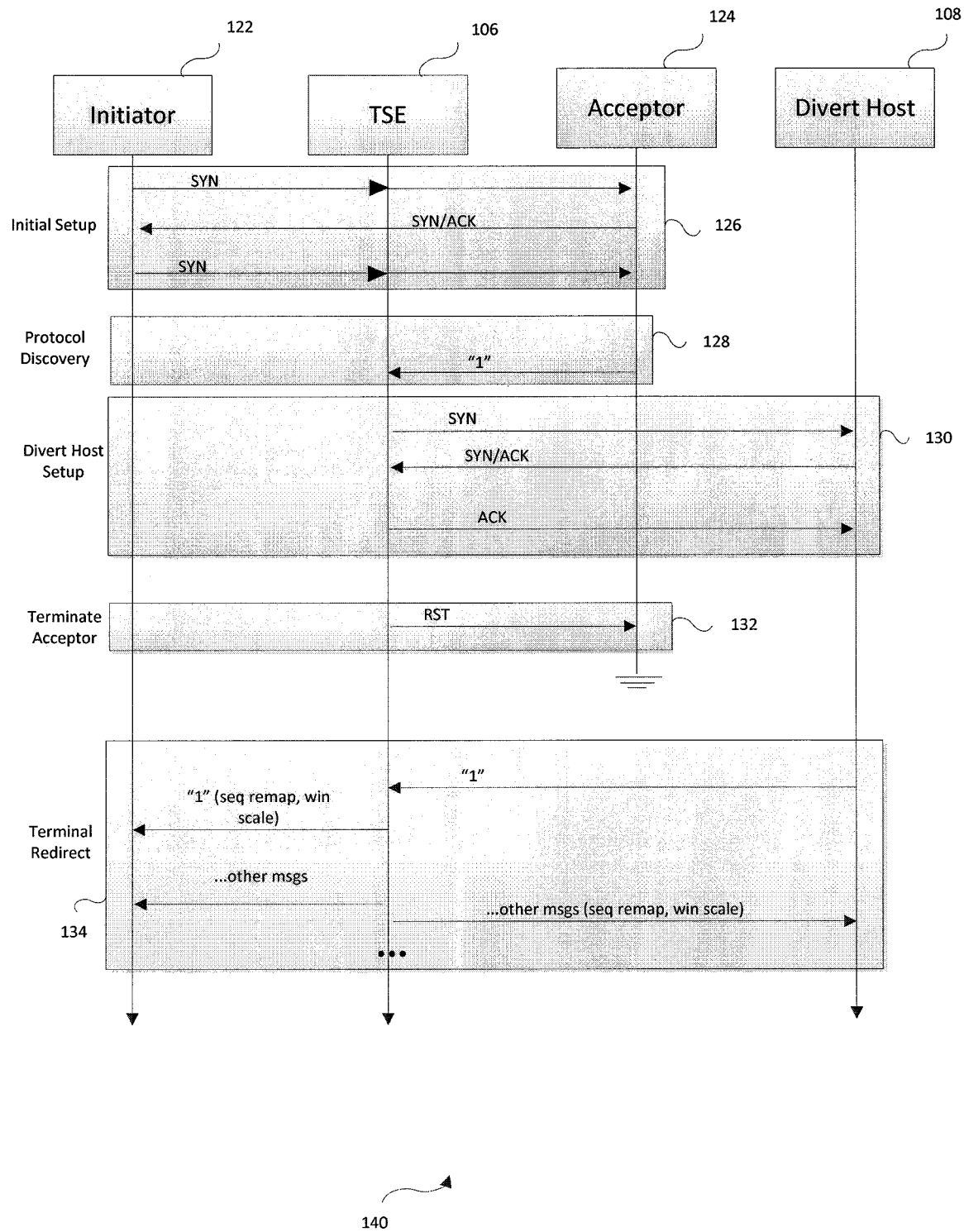
FIG. 3 is communications flow diagram illustrating diversion of a TCP communication session based upon content sent by an acceptor.

In another example of diversion of a communication session is shown in FIG. 3. FIG. 3 is a communications flow diagram illustrating diversion of a TCP communication session based upon content sent by an acceptor and is shown generally as 140. At initial setup 126, initiator 122 attempts to establish a communication session with acceptor 124. TSE 106 monitors this attempt. By way of example, protocol discovery 128 identifies the signature "1" in the first packet sent by acceptor 124. After recognizing this signature TSE 106 duplicates the initiation connection messages to divert host 108 through divert host setup 130. Terminate acceptor 132 then closes the connection to acceptor 124. Finally, terminal redirect 134 joins initiator 122 to divert host 108.

For the examples illustrated in FIG. 2 and FIG. 3 the connection with acceptor 124 is terminated after forming a connection with divert host 108. This connection could have been terminated prior to forming a connection with divert host 108, but the sequence in the examples has the advantage of permitting fall-back to the intended communication if for some reason divert host 108 was unavailable.

Figure 4:
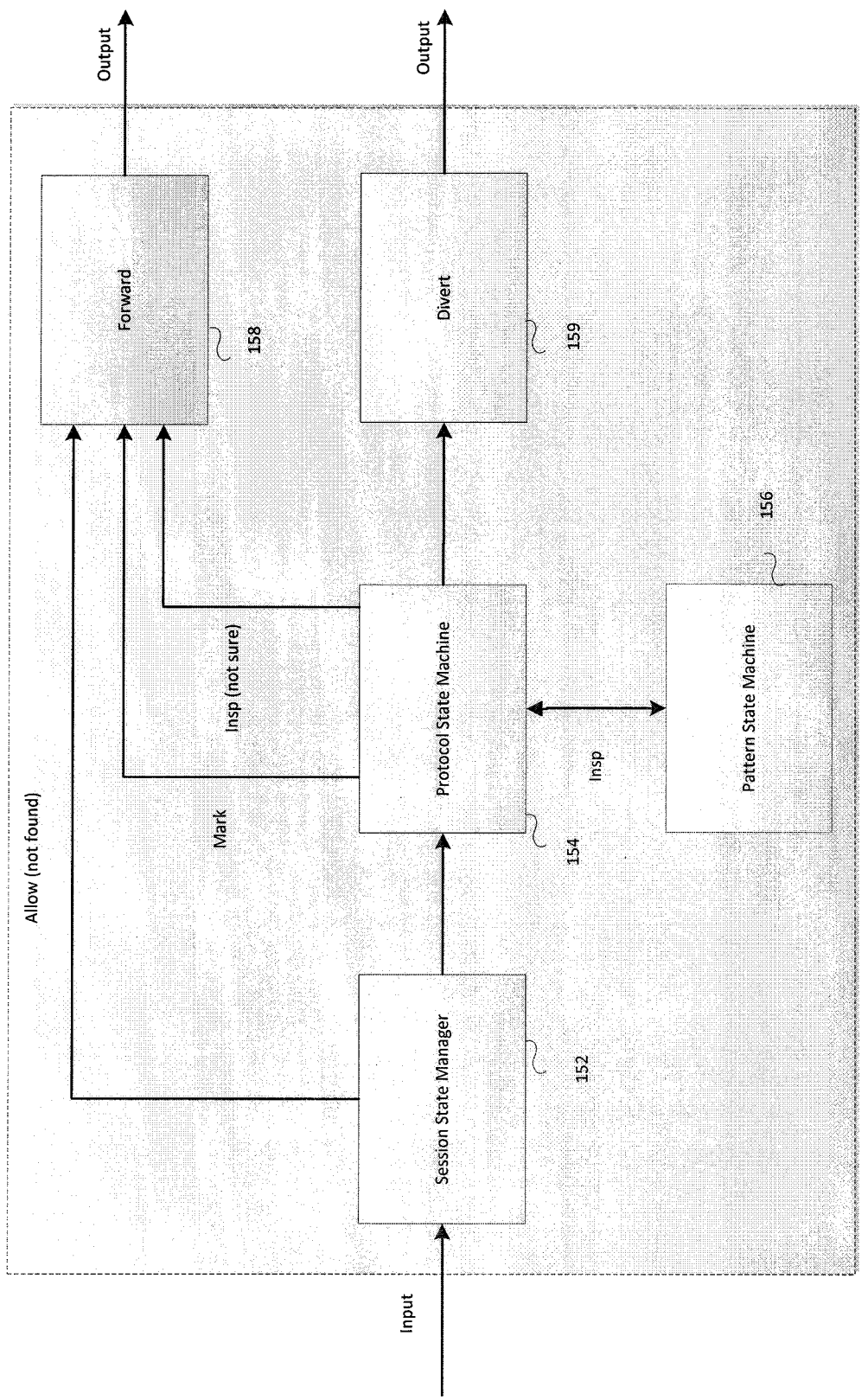
FIG. 4 is a packet flow diagram of an implementation of a TSE.

Referring now to FIG. 4 a packet flow diagram of an implementation of TSE 106 is shown generally as 150. The main components of TSE 106 are: session state manager 152, protocol state machine 154, and pattern state machine 156. Session state manager 152 maintains a session state record (not shown) for each communication session, at least initially. The session state record is used by both protocol state machine 154 and pattern state machine 156 to track the progression of a communication session.

Packets arrive at session state manager 152. Packets may come from an initiator 122 an acceptor 124 or a divert host 108. When session state manager 152 receives a packet, it first determines if the packet is an attempt to start a new communication session. If this is the case, state manager 152 creates a new session state record. By way of example, in a TCP session, a new state record will only be created if the packet has the SYN flag set. If the packet indicates a communication session already in progress, state manager 152 searches for a corresponding session state record in a session state table. If a state record cannot be found, an "allow" state is implied and the packet is allowed to proceed to its intended destination via forward module 158. This is the mechanism for allowing packets from protocols which are not of interest to pass without consuming state memory. It is also reasonable to have explicit "allow" state(s) for other purposes such as accounting.

If session state manager 152 determines that a state record exists, the current packet is examined by protocol state machine 154. If the session state record indicates DIVERT, then the packet is sent to a divert host 108 via divert module 159. If the session state record is in MARK state, the packet is marked and sent to its intended destination via forward module 158. If the session state record is in INSPECT state the packet is sent to pattern state machine 156 to be examined. If pattern state machine identifies the packet to be part of a protocol of interest, then it sets the session state record to DIVERT and protocol state machine 154 then sends the packet to a divert host 108 via divert module 159. If pattern state machine 156 concludes that no protocol of interest exists, then the session state record is deleted, thus allowing all packets to pass directly through TSE 106 without maintaining state. If pattern state machine 156 determines that the packets of the communication session should be marked, the session state record is changed to MARK so that all packets are marked before being sent by forward module 158.

Session state records will be deleted in the cases of a pattern match resulting in "allow", timeout due to inactivity, or indications that the session cannot be diverted for other reasons. Other reasons may include the inability to connect to a host or the presence of unsupported communication options.

In an embodiment of the system for diverting established communication sessions, a different protocol state machine 154 is required for each communications transport protocol of interest. (e.g. TCP, UDP).

As indicated previously, TSE 106 may redirect initiator/acceptor communications to initiator/divert host and it may also redirect initiator/acceptor communications to a divert host/acceptor.

Figure 5A:
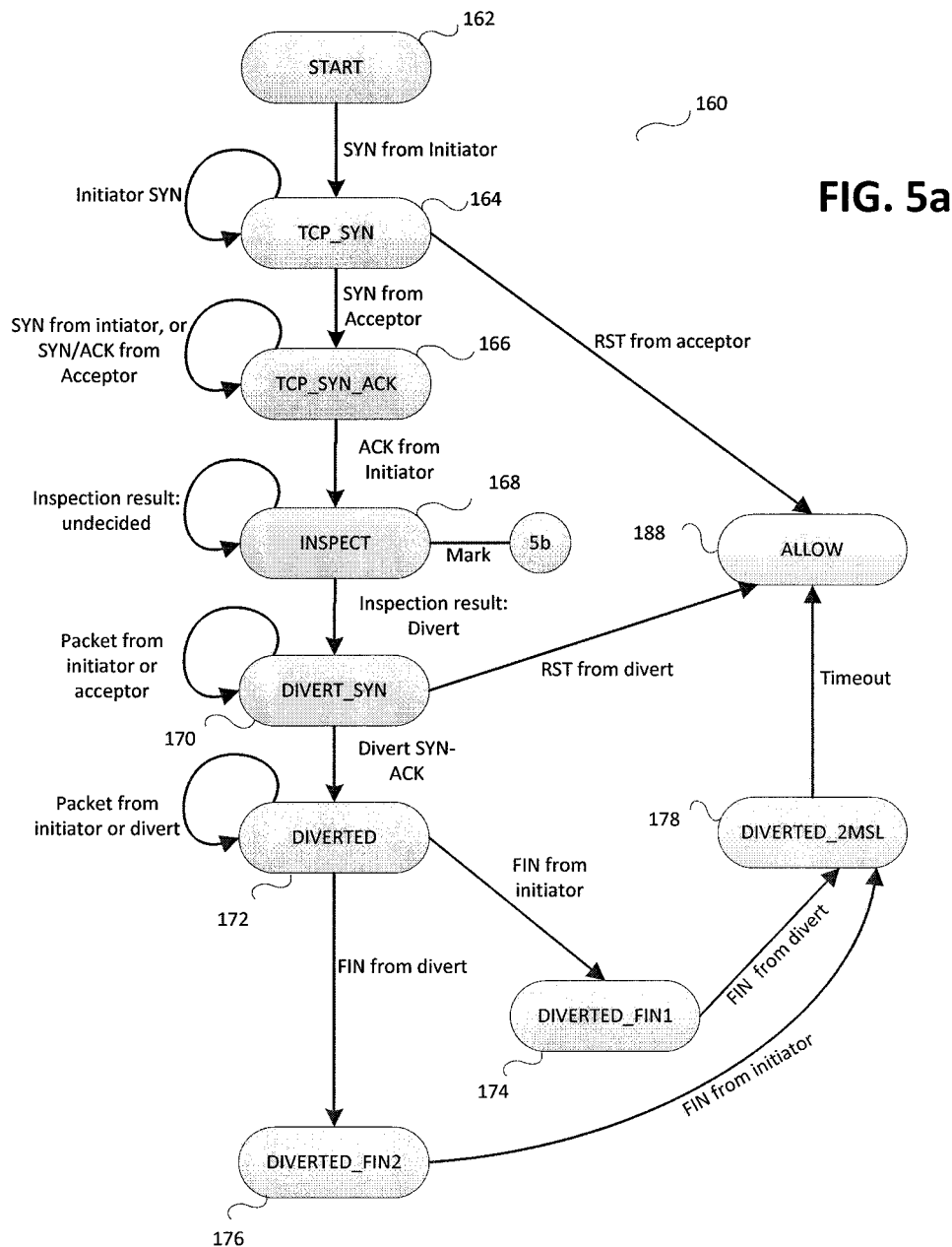
FIGS. 5*a* and 5*b* are state diagrams of the states of a TCP protocol state machine.
Figure 5B:
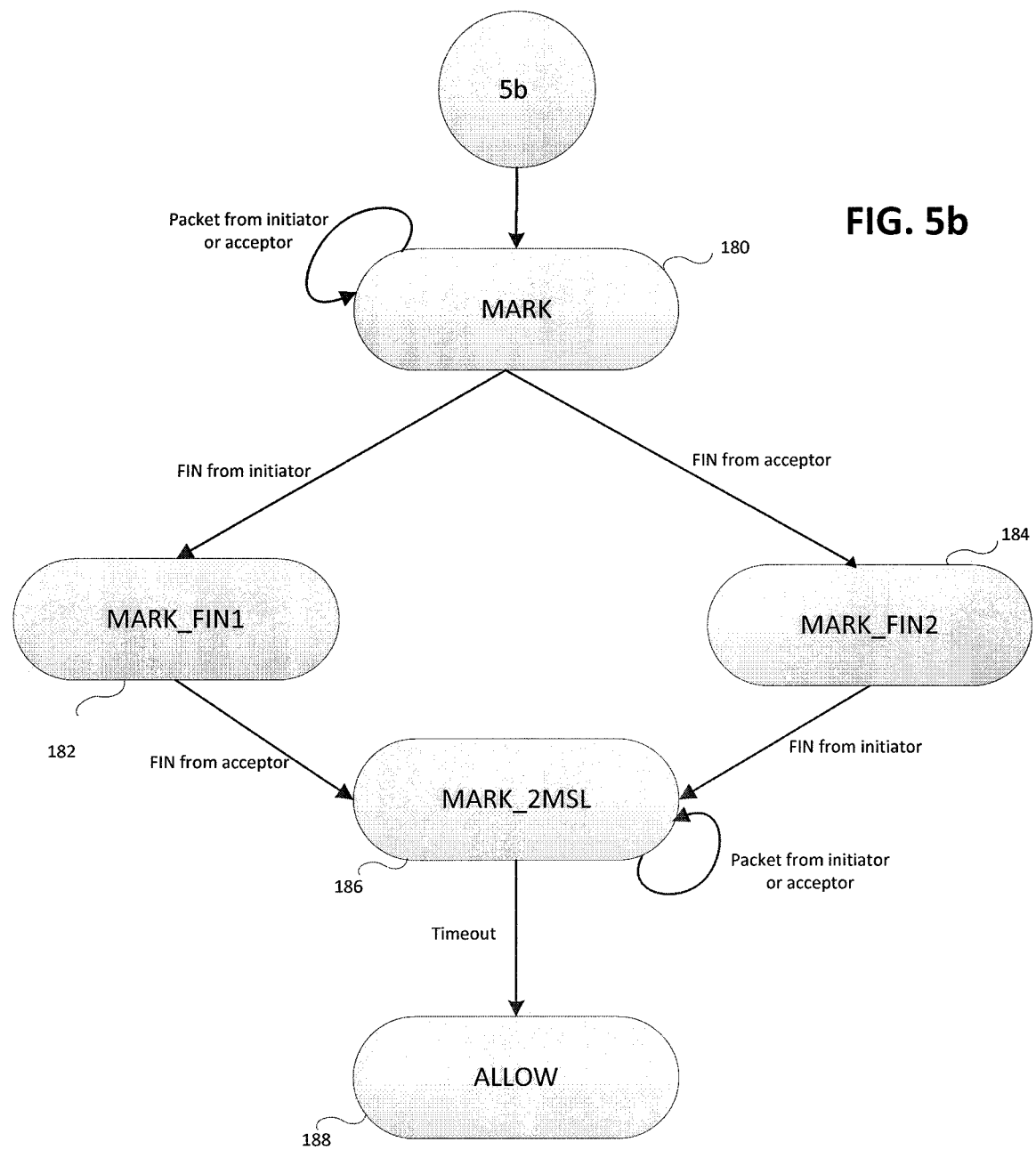

Referring now to FIGS. 5*a* and 5*b*, a state diagram of the states of a TCP protocol state machine is shown generally as 160. Table 1 describes the states and actions associated with state transitions of TCP protocol state machine 160. In Table 1, a blank field in the Next State column indicates that the state does not change.

TABLE 1

| Current State | Event | Next State | Action |
| --- | --- | --- | --- |
| START 162 | Initiator SYN packet | TCP_SYN | Forward to acceptor. Record initial sequence number, win_Scale, MSS, and SACK |
| TCP_SYN 164 | Acceptor SYN/ACK packet | TCP_SYN_ACK | Forward to initiator, record acceptor sequence number, win_scale, MSS, and SACK |
|  | Acceptor RST packet | ALLOW (delete session record) | Forward to initiator |
|  | Initiator SYN packet |  | Forward to acceptor |
| TCP_SYN_ACK 166 | Initiator ACK | INSPECT | Forward to acceptor |
|  | Initiator ACK, with data | INSPECT | Run pattern match on packet and apply INSPECT state rules |
|  | Acceptor SYN/ACK packet |  | Forward to initiator |
|  | Initiator SYN packet |  | Forward to acceptor |
| Inspect 168 | Initiator packet, pattern match decides "allow" | ALLOW (delete session record) | Forward to acceptor |
|  | Acceptor packet, pattern match decides "allow" | ALLOW (delete session record) | Forward to initiator |
|  | Packet from initiator or acceptor, pattern match decides "divert" | DIVERT_SYN | Send SYN to divert host as though from initiator, save data from initiator |
|  | Packet from initiator or acceptor, pattern match undecided |  | Forward to acceptor. Save the data in case divert is required. |
|  | Packet from acceptor, pattern match undecided |  | Remove data from packet, leaving only ACK; send to initiator |
|  | Packet from initiator, pattern match decides "mark" | MARK | Apply marking to the packet, forward to acceptor |
|  | Packet from acceptor, pattern match decides "mark" | MARK | Apply marking to the packet, forward to initiator. |

TABLE 1-continued

| Current State | Event | Next State | Action |
|---|---|---|---|
| DIVERT_SYN 170 | Divert host SYN/ACK | DIVERTED | Replay saved client data to divert host. Send Reset to acceptor |
| | Packet from acceptor | | Silently drop packet |
| | Packet from initiator | | Re-send SYN to divert host |
| DIVERTED or DIVERTED_FIN1 or DIVERTED_FIN2 (172, 174, 176 respectively) | Packet from initiator | | Re-map ACK number; send to divert host |
| | Packet from divert host | | Re-map sequence number; send to initiator |
| | Packet from acceptor | | Discard |
| | FIN received from initiator | DIVERTED_FIN1 | Re-map ACK number; send to divert host |
| | FIN received from divert host | DIVERTED_FIN2 | Re-map sequence number; send to initiator |
| DIVERTED_FIN1 174 | FIN received from divert host | DIVERTED_2MSL | Re-map sequence number; send to initiator |
| DIVERTED_FIN2 176 | FIN received from initiator | DIVERTED_2MSL | Re-map ACK number; send to divert host |
| DIVERTED_2MSL 178 | Packet from initiator | | Re-map ACK number; send to divert host |
| | Packet from divert host | | Re-map sequence number; send to initiator |
| | Packet from acceptor | | Discard |
| | Timeout | ALLOW (delete session record) | |
| MARK 180 | Packet from initiator | | Apply marking to the packet, forward to acceptor |
| | Packet from acceptor | | Apply marking to the packet, forward to initiator |
| | FIN from initiator | MARK_FIN1 | Apply marking to the packet, forward to acceptor |
| | FIN from acceptor | MARK_FIN2 | Apply marking to the packet, forward to initiator |
| MARK_FIN1 182 | FIN received from acceptor | MARK_2MSL | Apply marking to the packet, forward to initiator |
| MARK_FIN2 184 | FIN received from initiator | MARK_2MSL | Apply marking to the packet, forward to acceptor |
| MARK_2MSL 186 | Packet from initiator | | Apply marking to the packet, forward to acceptor |
| | Packet from acceptor | | Apply marking to the packet, forward to initiator |
| | Timeout | ALLOW | |
| ALLOW 188 | | | Session is deleted from session table |

As shown in Table 1, INSPECT state 168 may remain in an undecided mode until it determines to allow or divert.

Not shown in FIG. 5 are timeout transitions from each state to the ALLOW state. These transitions have been omitted for clarity. When a session enters the ALLOW state, it is removed from the session state table. Therefore not finding a session in the table implies the ALLOW state and a policy of allowing the session to pass without diverting or marking it.

Figure 6:
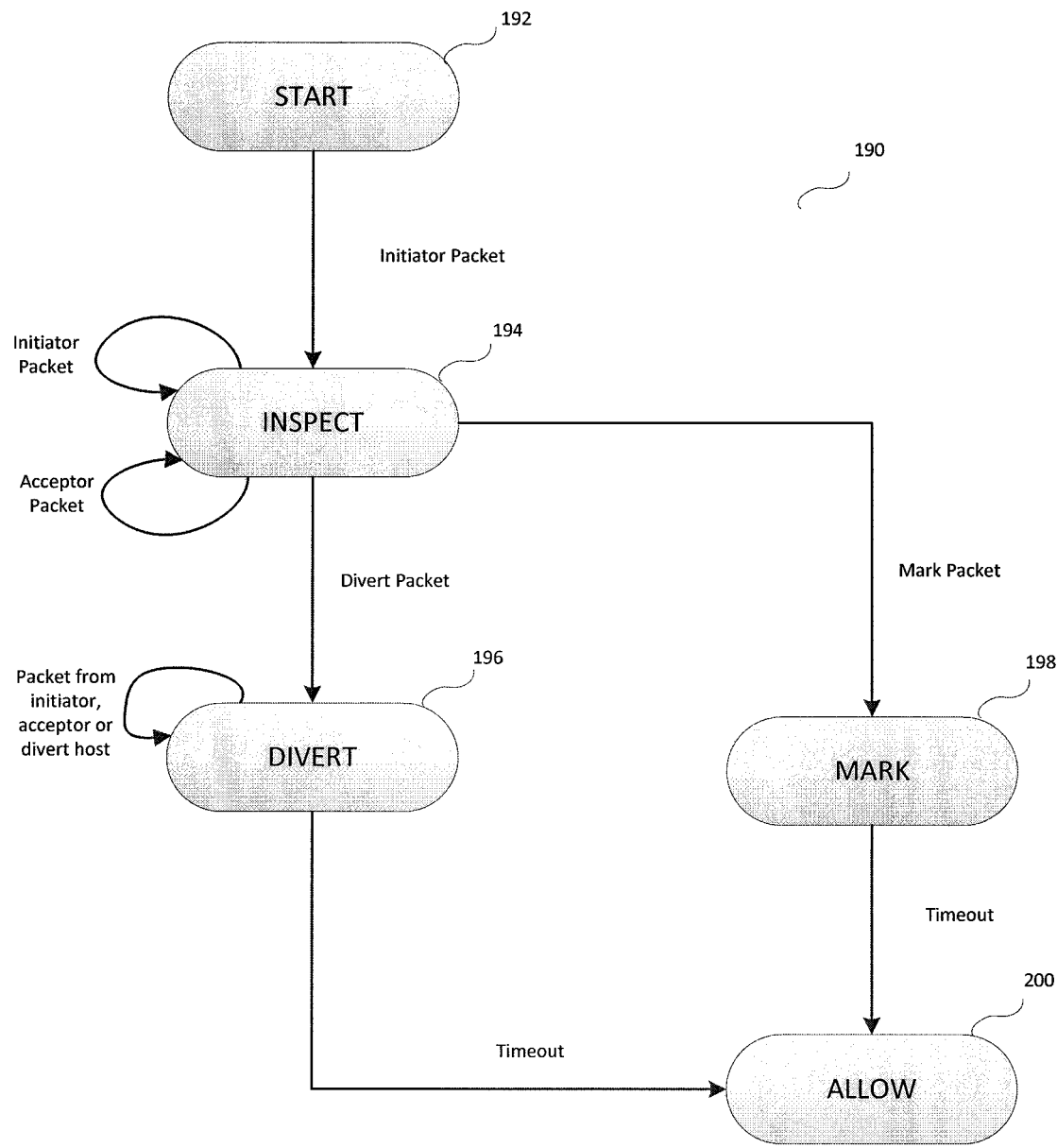
FIG. 6 is a state diagram of the states of a UDP protocol state machine.

Referring now to FIG. 6, a state diagram of the states of a UDP protocol state machine is shown generally as 190. Table 2 describes the states and actions associated with state transitions of UDP protocol state machine 190. In Table 2, a blank field in the Next State column indicates that the state does not change.

As the UDP protocol does not have a start indication (as SYN does with TCP), an implicit "allow" is not possible; any packet will create a session if it doesn't exist. Sessions are closed by timeout.

TABLE 2

| Current State | Event | Next State | Action |
|---|---|---|---|
| START 192 | Initiator Packet | Inspect | Forward to acceptor |
| INSPECT 194 | Initiator packet, pattern match decides divert | DIVERT | Replay saved packets to divert host. Send current packet to divert host. |
| | Acceptor packet, pattern match decides divert | DIVERT | Replay saved initiator packets to divert host. Discard current packet. Send ICMP unreachable message. |
| | Initiator packet, pattern match decides mark | MARK | Apply marking to the packet, forward the acceptor |
| | Acceptor packet, pattern match decides mark | MARK | Apply marking to the packet, forward to initiator |
| | Initiator packet, pattern match undecided | | Forward to acceptor, save packet for replay |
| | Acceptor packet, pattern match undecided | | Discard packet |
| DIVERT 196 | Initiator packet | | Forward to divert host. Reset teardown timer |
| | Divert packet | | Forward to initiator. Reset teardown timer |
| | Acceptor packet | | Send ICMP unreachable message. Discard packet. |
| | Teardown timeout | ALLOW | |
| MARK 198 | Initiator packet | | Apply marking to packet, forward to acceptor. Reset teardown timer |
| | Acceptor packet | | Apply marking to packet, forward to initiator. Reset teardown timer. |
| | Teardown timeout | ALLOW | |
| ALLOW 200 | | | Session is deleted from session table. |

Referring back to FIG. 4 the functionality of pattern state machine 156 is detailed. Each communication session has a pattern state associated with it. Pattern state machine 156 attempts to match the packets of a communication session to a protocol of interest.

When protocol state machine 154 is in the INSPECT state (168, 194), the pattern state of the current communication session is used in conjunction with the contents of the current packet to determine the next pattern state or to move protocol state machine 154 into another state.

Table 3 illustrates a simple example of a pattern state machine 156 that distinguishes between three protocols, as set out in Table 3, and other protocols. The protocols are recognized using the rules:
1. one in which the initiator sends "GET"
2. another in which the initiator sends "Hello" and receives "Welcome"; and
3. a third in which the initiator sends "Hello" and receives anything other than "Welcome"

TABLE 3

| State | Event | Next State | Result |
|---|---|---|---|
| INITIAL | Initiator sends "Hello" | CLIENT_HELLO | Undecided |
| | Initiator sends "GET" | DIVERT | Divert, protocol 1 |
| | Initiator sends anything other than "GET" or "Hello" | ALLOW | Allow |
| CLIENT_HELLO | Acceptor sends "Welcome" | DIVERT | Divert, protocol 2 |
| | Acceptor sends something other than "Welcome" | DIVERT | Divert, protocol 3 |

Once a pattern is definitively matched, divert host 108 is chosen and a scheme is selected for tagging packets deliver to divert host 108. For example, the scheme could be VLAN tagging of Ethernet packets, MPLS tagging or some other form of tagging. The choice of scheme allows a divert host 108 to know which protocol is to be used, since divert host 108 may not otherwise have enough information to know the protocol.

The system 100 may reside in Traffic Switching Element (TSE) 106. TSE 106 is capable of marking or diverting in-progress communication sessions which have had initial set-up, including sessions using the TCP protocol, on the basis of pattern-matching the content of the communication. Marking packets in a communication stream allows devices such as distribution router 104 and core router 110 (see FIG. 1) to implement policy decisions on packets. Examples of marking include, but are not limited to: Differentiated Services Code Point (DSCP), and Type of Service (TOS).

The TCP standard (RFC: 793, Transmission Control Protocol, DARPA Internet Program, Protocol Specification, September 1981), specifies "sequence numbers" to be carried within each packet to indicate the relative position of the packet with respect to the start of the communication session. Also "acknowledgement numbers" are carried within packets traveling in the opposite direction to indicate which data has been received. Since the initial sequence number for each session is chosen arbitrarily by the acceptor, the chance is very low that a divert host 108 would choose the same initial sequence number as the original acceptor 124.

One solution to the problem is to indicate to divert host 108 which initial sequence number was used by acceptor 124. However, since there is currently no standard for communicating this, custom modification of divert host 108 is required.

In some cases, sequence numbers sent from divert host 108 to initiator 122 are re-mapped. In some cases, splicing includes re-mapping of sequence numbers set from divert host 108 to initiator 122. When a packet is received by TSE 106 from a divert host 108, the sequence number is increased by the difference between the initial sequence number of the acceptor 124 and the initial sequence number of the divert host 108. Similarly, acknowledgement numbers in packets traveling from initiator 122 to divert host 108 are decreased by the same difference. For those packets containing TCP selective-acknowledgement fields, the selective-acknowledgements are treated the same as the acknowledgement numbers.

TCP RFC 793, 1323 TCP Extensions for High Performance, May 1992, requires each TCP packet to contain a "window" value, which represents how many bytes may be sent without acknowledgement. The standard provides for an optional "window scaling" parameter to be provided by each node to packets containing the SYN flag. This scaling indicates how the window field is to be interpreted and is to be used for the duration of the session. A difficulty is that a divert host 108 may choose a different window scaling than that of acceptor 124. As with sequence numbers, divert host 108 could theoretically be informed of which value to use. However, without a standard way of communicating this, custom modification of divert host 108 would be required.

In some cases, the window values are re-scaled into the correct range. In an embodiment, when splicing, window values are re-scale into the correct range. For a packet from divert host 108 being sent to an initiator 122, the window value is scaled down by the difference between the window scale of acceptor 124 and the window scale of divert host. If the difference is negative the window is scaled up.

Although the examples presented herein are for TCP/IP and UDP, making a decision to alter a communication session transparently based on the contents of it can be applied to other communication protocols.

It will be understood that a device capable of acting on transport layer connections, such as Transmission Control Protocol (TCP) or User Datagram Protocol (UDP) connections, is generally termed a layer-4 device. Many layer-4 devices are capable of selectively routing traffic, also known as splicing traffic, diverting traffic or the like, to service chains on the basis of TCP or UDP port numbers. Generally, the layer-4 devices make decisions packet by packet. A problem with a port-based approach to decision making is that this approach does not allow signature-based protocol recognition to figure into the decision; only IP-address and port-based decisions are possible. Generally, a protocol cannot be determined by port number alone. At best, decisions can be made by historical use of a port by an application, but this process does not generally allow diverting on the first use of a port.

A service chain is a name generally used to refer to a series of one or more network devices that are connected together in series such that traffic must travel through all of the devices from one end to the other. As described in this document, multiple service chains may be available and selectable by the TSE (106).

The embodiments of the system and method provided herein are intended to provide a more useful approach by considering each transport layer connection as something that may be diverted or not, in its entirety. It may be better for divert decisions to be based on early packets of the connection, including finer details within a protocol, such as Hypertext Transfer Protocol (HTTP) request type.

Advantages of diverting transport layer connection to a service chain are intended to include:
  i. Reduce network cost—only redirect relevant traffic and save on the service chain element processing;
  ii. Delivery of value-added services such as parental control, video optimization, caching, etc.;
  iii. Improve subscribers' experiences by reducing latency to deliver content; and the like.

In a network, each of the value-added services may only function on some classes of traffic, or may be more efficient on some classes of traffic over other classes. Service-chain resources are thus most efficiently used when a divert decision also considers the class of traffic when selecting the service chain to send or divert a connection to. A challenge is that many types of connections of interest cannot be distinguished from one another until several packets into the conversation in both directions, and in some cases, not until after the initial set-up process is complete. In view of this challenge, the embodiments of the system and method described herein are configured to save packets and later replay the packets when a specific service chain is selected.

In some cases, communication sessions, sometimes referred to as connections, may have a full divert deployment or a half divert deployment. Full divert deployment is defined as a deployment where all service chain elements become in-line with the diverted transport layer connection. The original acceptor connection may remain open. Half divert deployment is defined as a deployment where one of the service chain elements takes over the role of the original acceptor, for example, becomes a divert host, and the connection with the original acceptor is terminated. Full-divert or half-divert is selected based on the capabilities of the divert host.

In order for a service chain component to understand a TCP connection and add or modify packets and/or reply to a connection, the service chain component typically needs to know the TCP handshakes as well as the connection's previous packets from both the client and the acceptor direction.

ISPs may select a service chain for each traffic flow (or connection) on the basis of application protocol because (a) a given service chain may not support or not require all applications and (b) the ISP desires to apply different policies for different applications. Traffic that will not benefit from a service should not be routed through that service's equipment.

Figure 7:
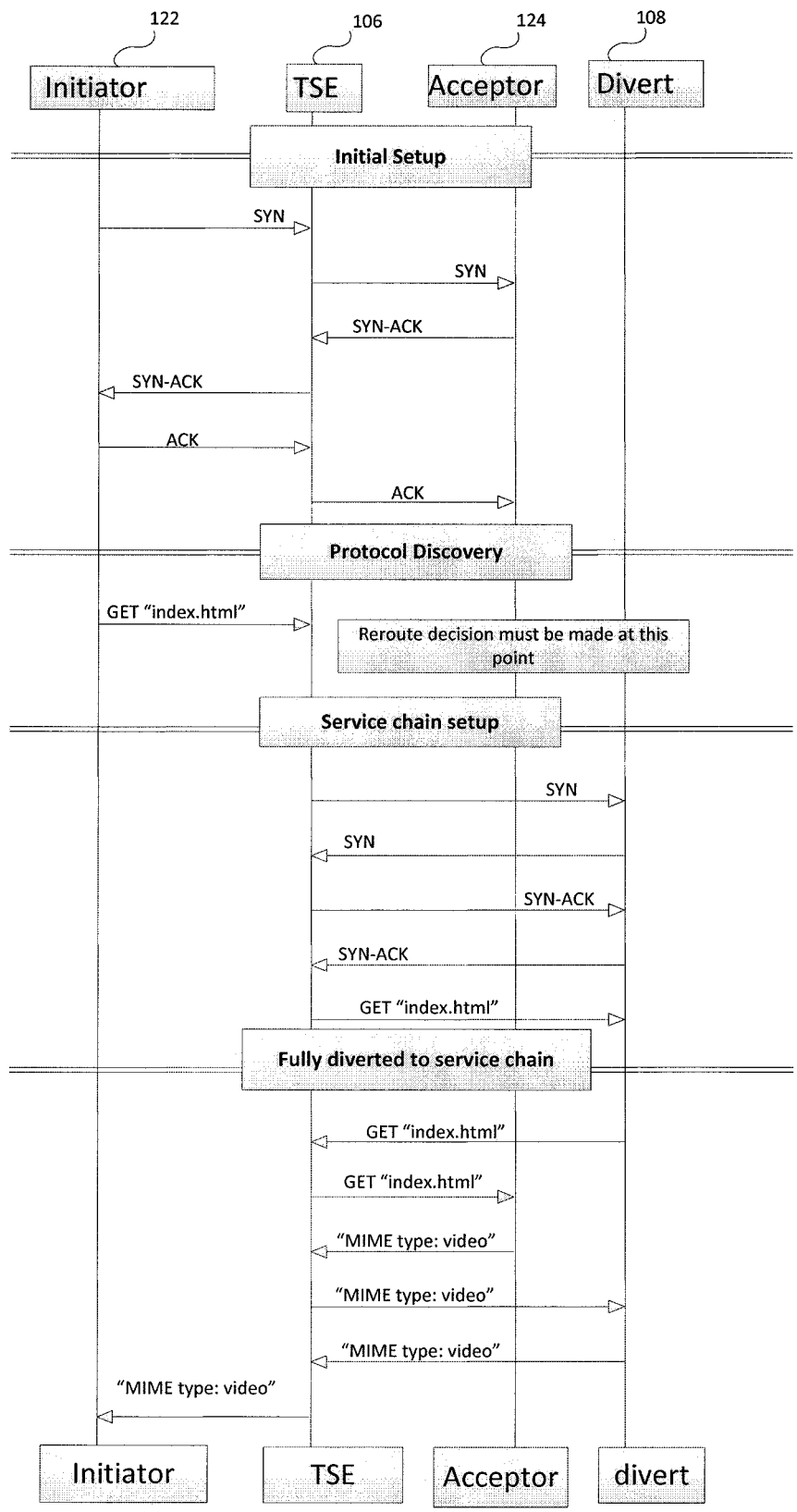
FIG. 7 illustrates a full divert example with the divert occurring after the initial setup.

For TCP communication, an embodiment of diverting a communication session may be made at the first non-TCP handshake packet as detailed above. This process of performing full-divert is illustrated in FIG. 7. A divert decision is made on receipt of the packet 'GET "index.html"'.

As an example as illustrated in FIG. 7, during the initial setup, the initiator 122 (in this case, a client or subscriber), will send SYN packet to the Traffic Switching Element (TSE) 106 and the TSE will forward the same SYN packet to the acceptor 124, which in this case is a server. The acceptor 124 responds with SYN-ACK and sends the message to the TSE 106. The TSE 106 will forward the SYN-ACK packet to the initiator 122. The initiator 122 will then send an acknowledge (ACK) packet to the TSE 106 where the TSE 106 will then forward the ACK to the acceptor 124. The initiator 122 or client will then typically send a data message to the TSE. As the initial set up of the communication session has been completed, and an established communication has resulted, it is at this point that the TSE 106 may make a decision as to whether there can be diverting or splicing of the communication session. If not, the TSE 106 may not divert the TCP connection after the flow of the content or the requested data. If, in the above example, the communication session was diverted to the divert host 108 later in the communication session, there may be an issue because the divert host 108 would see a broken TCP connection as the TSE 106 would not send the 'GET "index.html"' packet to the divert host 108 and the divert host 108 would not know how to respond.

Once the TSE 106 has forwarded the 'GET "index.html"' to the divert host 108, the connection is said to be fully diverted to the service chain, as shown in FIG. 6 as divert state 196, where TSE 106 will forward packets received from the initiator 122 and acceptor 124 to the divert host 108. In addition, the TSE 106 will forward packets received from the divert host 108 to the initiator 122 and acceptor 124.

Even with the advances made by diverting a communication session after the initial set up and on receipt of the 'GET"index.html"' packet, it is still desirable to provide the ability to divert a communication session even after some non-trivial exchange of application data or content packets, after the TCP handshake packets has already occurred between the initiator and acceptor nodes. The embodiments detailed herein are intended to provide for a system and method to divert the communication session after the flow of data packets. In some cases, the decision to divert may be on content occurring in first or subsequent packets of an acceptor response, such as Multipurpose Internet Mail Extensions (MIME) types or other criteria, such as, content length, HTTP status code, or the like.

It is intended for the embodiments of the system and method detailed herein to selectively divert traffic to different service chains after some application-layer content has been exchanged within the transport-layer connection between the initiator and the acceptor. A service chain may have one or more divert hosts. It is intended that the method and system provided herein allow for diverting packets to at least one divert host within a service chain. In some cases, the method and system may divert a communication session to a supply chain with a plurality of divert hosts, wherein each divert host provides a particular service. In an example, one divert host may provide caching while another divert host may provide parental control. If a communication session wants to have both caching and parental control service, than the communication session may be diverted to a chain with both divert hosts.

Figure 8:
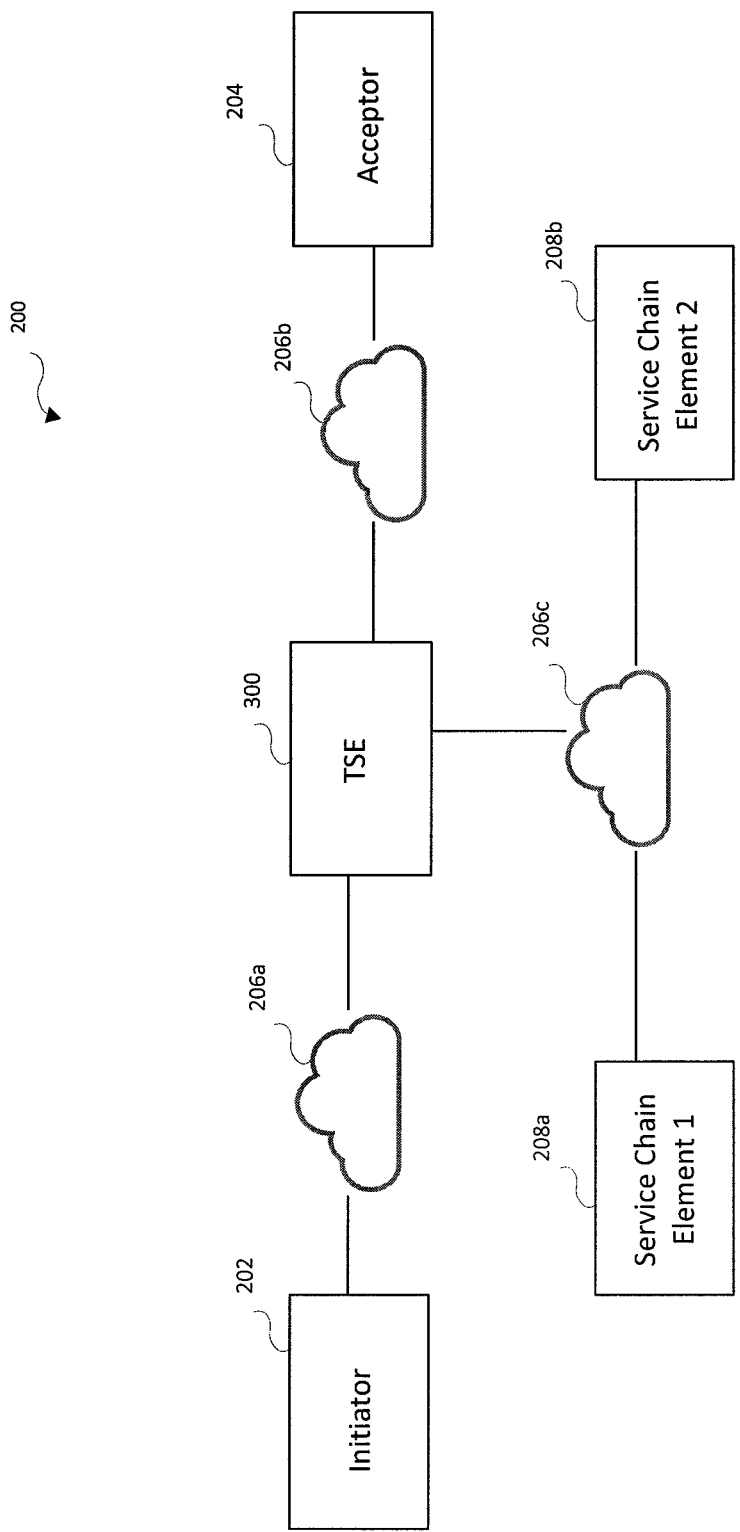
FIG. 8 illustrates an example environment for a system for diverting established communication sessions.

FIG. 8 shows an example environment 201 with an embodiment of a Traffic Switching Element (TSE) 300 within a communications network, for example, within an internet service provider's (ISP's) network.

The TSE 300 is operationally connected to other network elements 206a, 206b to allow communication packets to be transferred between an initiator 202 and an acceptor 204. The TSE 300 is intended to be positioned such that the TSE 300 is able to receive, process and forward packets if the packets are to be delivered.

The TSE 300 may also intercept and or splice connections and flows of packets between the initiator 202 and acceptor 204 and divert traffic to one or more service chain component 208a, 208b. The service chain components 208 may be operatively connected to the TSE 300 via a network element 206c. The service chain components may include at least one divert host and the service chain may be viewed as a transport mechanism for transporting or transmitting the packets to and from the divert hosts.

Figure 9:
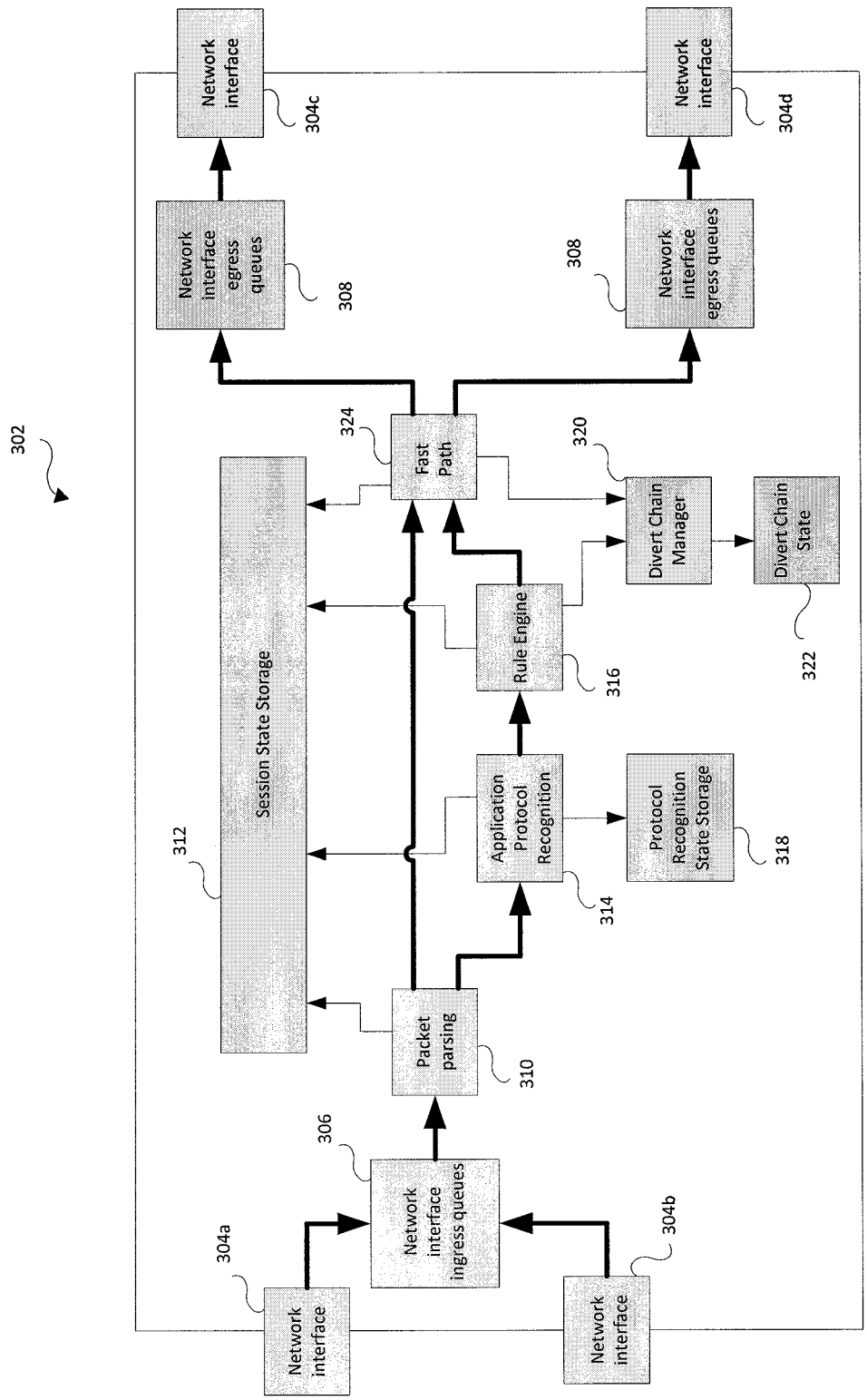
FIG. 9 illustrates a block diagram of a system for diverting established communication sessions according to an embodiment.

FIG. 9 illustrates an embodiment of a system 302 for diverting an established communication session. The system 302 may be housed in or hosted by the TSE 300. In some cases, the system 302 may be distributed and modules or components of the system 302 may be hosted by a plurality of TSEs or by a plurality of network devices.

The system 302 is configured to interface with other network components, for example, routers, switches, bridges, hubs, repeaters or the like, by, for example, cable, fiber optics, wireless connection, or the like, via a network interface 304. The system 302 and connected network components are typically intended to be configured to communicate at the same frequency and duplex settings.

Within the system 302, the network interfaces 304a and 304b are configured to receive ingress packets and store the packets into network interface ingress queues 306. The queues may be stored in random-access memory (RAM) or other memory module. The network interfaces 304c and 304d are configured to receive packets from at least one network interface egress queue 308 and send the packets to connected network components or other network equipment.

Although two ingress and two egress network interfaces 304 are shown, it will be understood that the system 302 may be configured to include any number of network interfaces 304 operatively connected to at least one network interface ingress queue 306 or network interface egress queue 308.

The system 302 further includes a packet parsing module 310. The packet parsing module 310 is configured to retrieve packets from at least one network interface ingress queue 306. The packet parsing module 310 is configured to identify information from the packet, for example, the IP addresses, transport layer protocol, port numbers and other site-identifying information, and the like. This information is used to index a state record from a session state storage 312, providing a state handle which will be associated with the packet as the packet is routed through the system 302.

Based on a session state, which may be determined and modified by the modules of the system 302 and may be stored in the session state storage 312, the packet may either be forwarded to a fast-path module 324 for immediate forwarding to either an original destination (which may be referred to as "bridging") or a diverted destination per the state, or to an application protocol recognition module 314 and a rule engine 316 to determine whether the traffic of the session should be diverted or not.

If a session state is not found, one is created in the session state storage 312 and associated with the packet. The initial state of a new session is intended to allow the packet to be reviewed by the application protocol recognition module 314 and the rule engine 316.

If the state is the initial state or more data is required, prior to making a divert decision, the application protocol recognition module 314 is configured to apply a combination of filters, regular expressions and heuristics to the data in the packet to, for example, select an application protocol, determine the protocol is not any known category, determine more data is required or the like. In some cases, the application recognition module 314 may store temporary results in a protocol recognition state storage 318. Once a complete result is known, the result may be stored in the session state storage 312 and the packet is passed to the rule engine 316.

Using the packet and session state, the rule engine 316 is configured to execute a set of rules that may be, for example, configured by a network operator, to decide what actions are to be applied to the current packet and later packets of the transport layer connection by updating session state. If the rules request a divert action, the rule engine 316 assigns the session state to a divert chain selected by a divert chain manager 320 and updates the session state to an "AWAIT_SYN" state as detailed further herein.

The divert chain manager 320 is configured with the permitted divert hosts and/or service chains that can be selected by the rule engine 316. Using the configuration, the divert chain manager 320 maintains forwarding rules, maximum frame size, health state and the like, of the service chains in a divert chain state module 322.

Using the packet and the session state, the fast path module 324 completes packet processing by forwarding packets to the network interface egress queue 308 for the output network interface 304, as indicated by the state stored in the session state storage.

Packets are sent to service chains by selecting a different next-hop for the packet than would be selected by normal packet switching or routing rules.

In one example, a service chain is located by a next-hop media access control (MAC) address on a particular network interface. In general, packets traveling from the initiator to the acceptor are sent to one next-hop and packets traveling from the acceptor to the initiator are sent to a different next-hop. The two directions are organized as pairs indicating opposing ends of the service chain.

Service chains may also include additional network qualifiers, for example, VLAN identifiers, MPLS tags, or the like, to address the desired chain. The network qualifiers may allow the system to connect to divert hosts in different network configurations. For example, in a case where multiple divert hosts have the same IP address, VLAN identifiers may be used to distinguish the divert hosts.

In another example, a service chain is located on a specific protocol at a specific IP address. For example, a service chain may be addressed by placing packets within a generic routing encapsulation (GRE) packet and sent to a GRE end-point.

In general, the first node in a full-divert service chain forwards to the next node, which forwards to the node after that, and so on. When exiting the chain, the packet generally returns to the system 302 for accounting and normal forwarding to the original initiator or acceptor end-point. Hence, diverting can be combined with other actions such as accounting, class-of-service marking, shaping and the like.

The divert chain manager 320 is intended to maintain a health state of the various configured chains by, for example, observing packets flowing through the chain, actively sending probe packets through the chain, health-checking the individual hosts in the chain, or the like, or some combination thereof. Maintaining a health state allows the divert chain manager 320 to identify a service chain that may be unresponsive. Consequently, new connections may not be diverted to the service chain and the initiator's 202 user experience will not be negatively impacted.

With the embodiments presented herein, it is intended that a divert decision can be made at any time before the transport layer connection is terminated.

The divert decision can be based on one or more of the inputs available at the time, including for example, one or a combination of:
 i. initiator or acceptor IP address;
 ii. initiator or acceptor transport layer port number;
 iii. application protocol;
 iv. subscriber attributes or characteristics;
 v. time of day;
 vi. acceptor load;
 vii. fields extracted from the content of the packets of the connection; flowing in either direction, such as HTTP MIME type; or the like.

There are advantages to allowing the divert decision point to be made at a later point in a communication session. For example, it is possible to selectively divert connections that have only specific content type to a particular service chain. This is intended to reduce the number of service chain elements required because the elements do not have to process connections that may not be able to be improved.

For example, in an embodiment it is intended that the method and system disclosed herein may selectively divert connections that have large content-length. This is intended to improve efficient use of the service chain for applications such as caching because cache transaction budget will not be wasted on connections that may not be significantly improved by caching. For example, connections that involve retrieving large media objects such as audio, images or video may be worth caching or optimizing, using a service chain.

Figure 10:
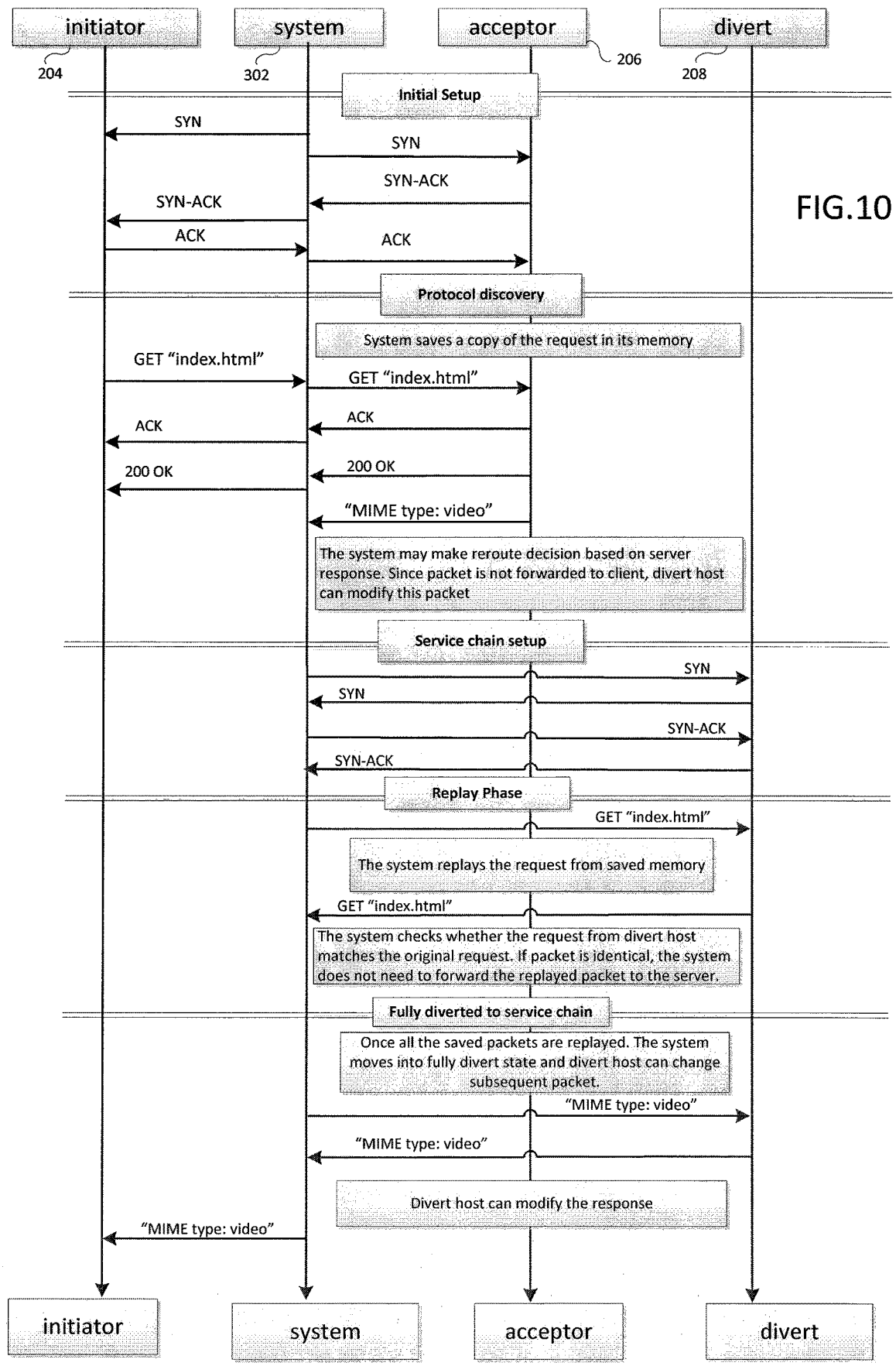
FIG. 10 illustrates an example of full divert of an established communication session.

An example of full-diverting an established and ongoing communication session is shown in FIG. 10. Until a divert decision is made, the protocol recognition state storage 318 is configured to keep a copy of every application-layer message that has been exchanged between the initiator 202 and acceptor 204, such as between a client and server. In addition, the divert decision may be delayed until the system 302 has received and parsed the MIME type (or other details) of the response from the acceptor 204. Once the divert decision is made, the divert chain manager 320 will initiate contact with a service chain by connecting to a service chain element 208, which in this example is a divert host. The protocol recognition state storage 318 is configured to send messages to the divert chain manager 320. The divert chain manager 320 is configured to be responsible for replaying the saved packets to the at least one divert host within the service chain. When the divert host forwards the replayed packets back to the divert chain manager 320, the divert chain manager 320 compares the replayed packets with the saved packets. If the application layer content is identical, the redirection can be continued. The fast path module 324 does not need to forward these replayed packet's to the other endpoint, for example, the initiator 202 in FIG. 8. Once all the saved packets have been replayed, the divert chain manager 320 will allow subsequent packets to be modified by the service chain.

With the ability to replay packets, the divert decision can be made even after the system 302 has forwarded non TCP-handshake packets to the acceptor 204 and initiator 202, respectively. The ability is intended to provide an advantage as it allows a divert decision to be determined at a later point in the connection. The system 302 will not forward the replayed packets, such as GET "index.html" and "200 OK" as shown in FIG. 10, to the acceptor 204 and initiator 202 during the replay phase. As these packets have already been forwarded to the acceptor 204 and initiator 202 during the protocol discovery phase. This is intended to ensure the acceptor and initiator will not see two copies of the same packet if a connection is being diverted to a service chain. This is intended to reduce latency in a diverted connection. Furthermore, the acceptor and initiator are intended to be unable to detect the connection is being diverted.

Figure 11:
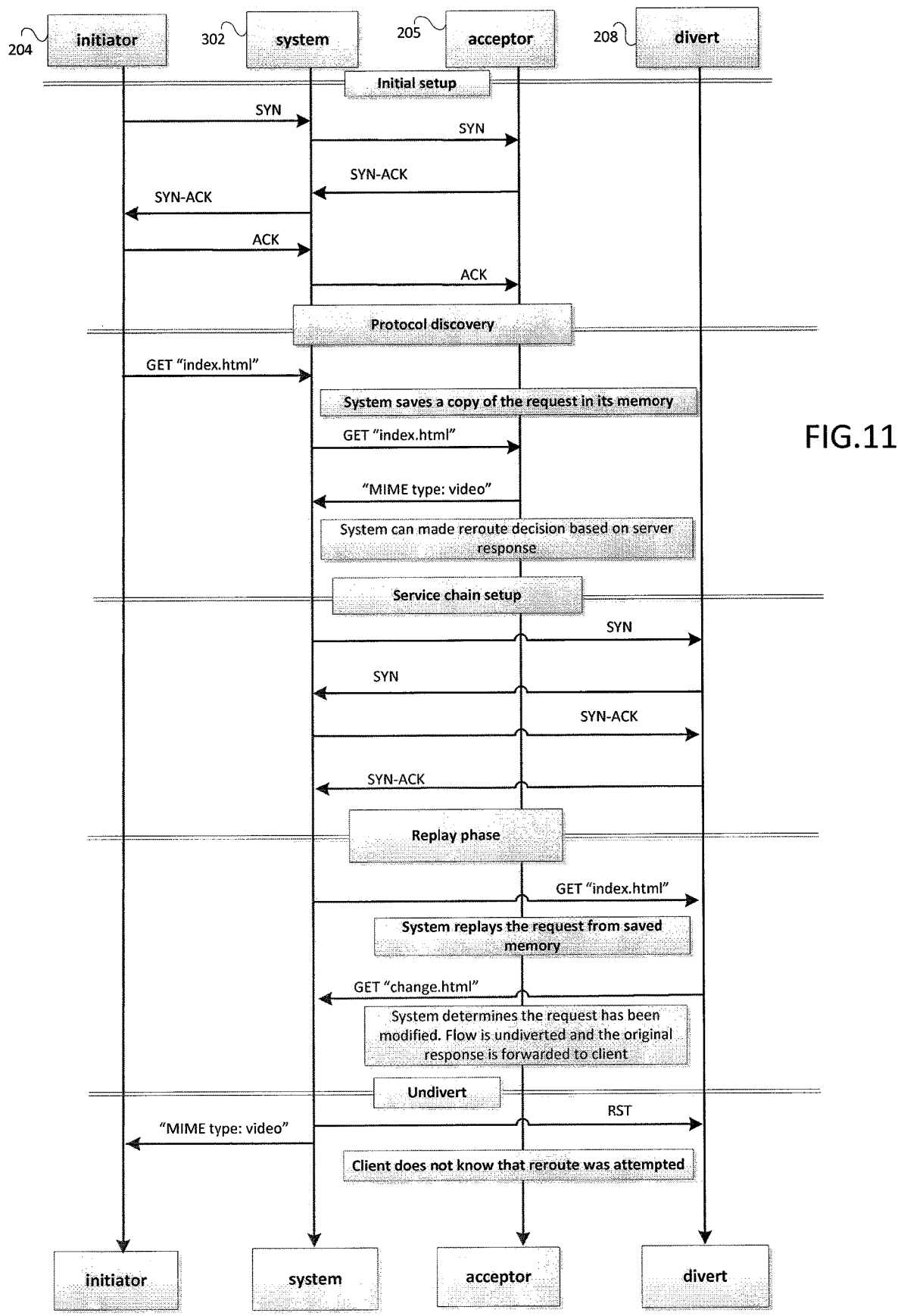
FIG. 11 illustrates an example of an undivert of an established communication session.

Referring now to FIG. 11, a second example of a communication session is shown. In this case, the divert chain manager 320 compares the replayed packets with the saved packet and determines that the service chain or divert host has modified at least one packet that has already been forwarded to an endpoint. The divert chain manager 320 stops the divert establishment procedure, which may be referred to as undiverting, and instead forwards any packets that had been received by the original acceptor but had not been forwarded and sets the session state so that diverting is not attempted again for the communication session. It is intended that the reason for this behavior is that if a divert host modifies the payload that has already been exchanged, the TCP connection will have invalid protocol semantics, which may confuse the initiator or the acceptor. As such, this feature is intended to be a safety mechanism against the divert host modifying the payload. Therefore, receipt of a modified packet results in undiverting the connection. The fast path module 324 causes the initiator and the acceptor to communicate via the original TCP connection without the service chain.

Figure 12:
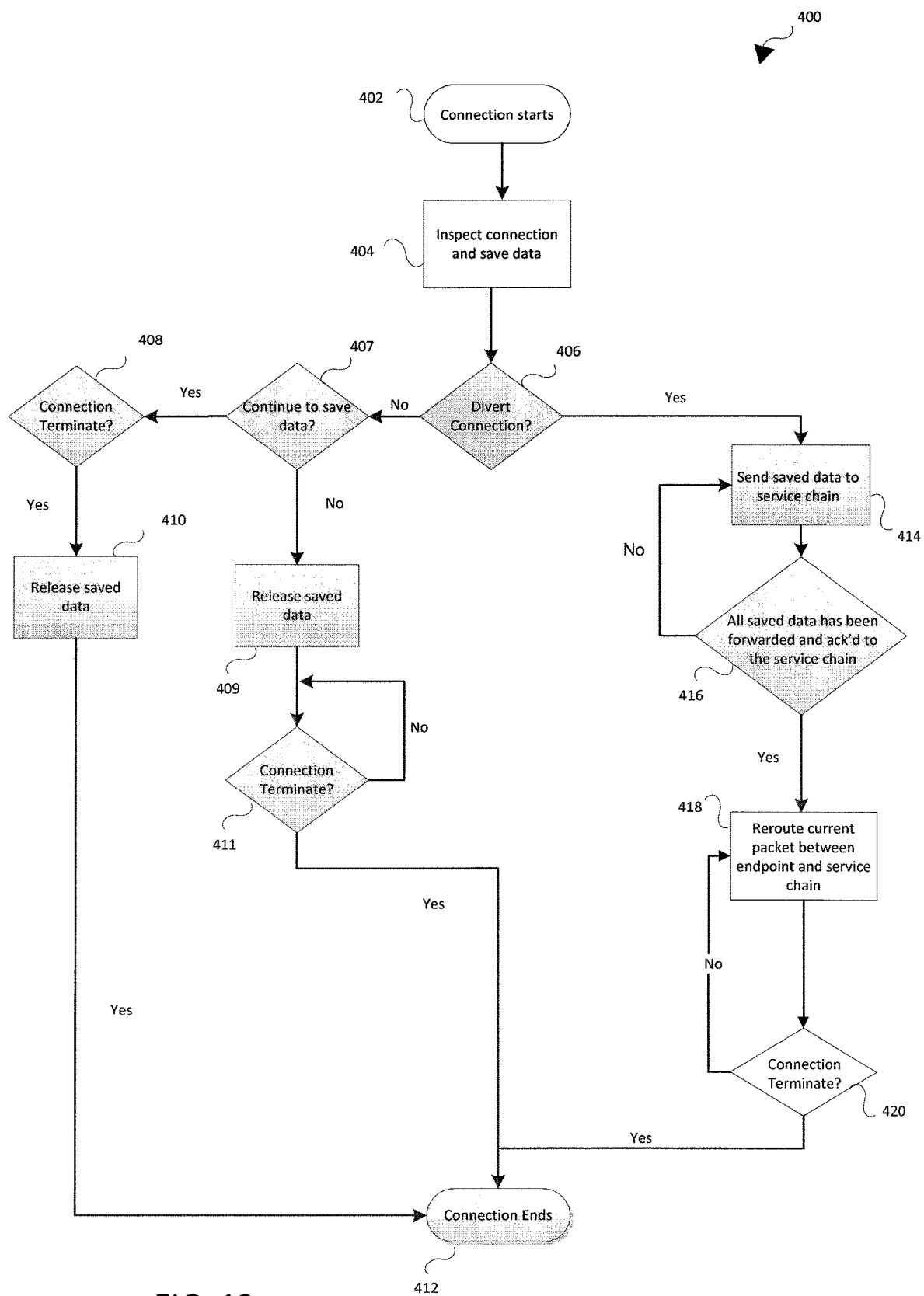
FIG. 12 is a flow chart of an embodiment of a method for a diverted communication session.

FIG. 12 illustrates an embodiment of a method 400 for diverting an established communication session. At 402, the connection starts, in this example a TCP connection is shown although other types of connections may be processed. At 404, the packet parsing module 310 inspects the connection and saves data, which may be saved in the protocol recognition state storage 318. The data that is saved may include information which is intended to allow the divert chain manager 320 to reproduce the communication session up to this point. In one case, every packet may be saved. In another case, which is intended to be a more memory-efficient approach, the protocol recognition state storage 318 may save the end-point coordinates and the TCP stream data.

At 406, the rule engine 316 determines whether to divert the connection. At 407, the rule engine 316 determines whether module 320 should continue to save data. If it is determined to stop continuing to save data, the saved data will be release at 409. The system 302 will then continue to wait until the connection is terminated at 411. If rule engine 316 determines module 320 should continue to save data, it will proceed to 408 to determine whether connection is terminated. If connection is terminated, the saved data will be released at 410. If connection is not terminated, 404 will have packet parsing module 310 to continue to inspect connection and save data.

At 414, if the rule engine 316 decides to divert the connection, the divert chain manager 320 is configured to continue to monitor any packets from the initiator and the acceptor and is further configured to send all of the saved data to the service chain and receive packets and/or acknowledgments from the service chain, at 416. After the saved data has been forwarded and received or acknowledged from the service chain, all new packets will be diverted between an endpoint and the service chain, at 418. At 420, the connection is terminated, for example, when the communication is completed.

When a packet going to the service chain is larger than the configurable maximum frame size of the service chain, the fast path module 324 segments the TCP packet into multiple packets or fragments or the UDP packets into multiple packets. TCP segmentation is splitting the packets in the transport layer where each packet is smaller than the maximum frame size. UDP fragmentation is splitting the packets in the network layer. In some cases, a separate module may be included in the system and may be configured to segment or fragment the packets.

Figure 13:
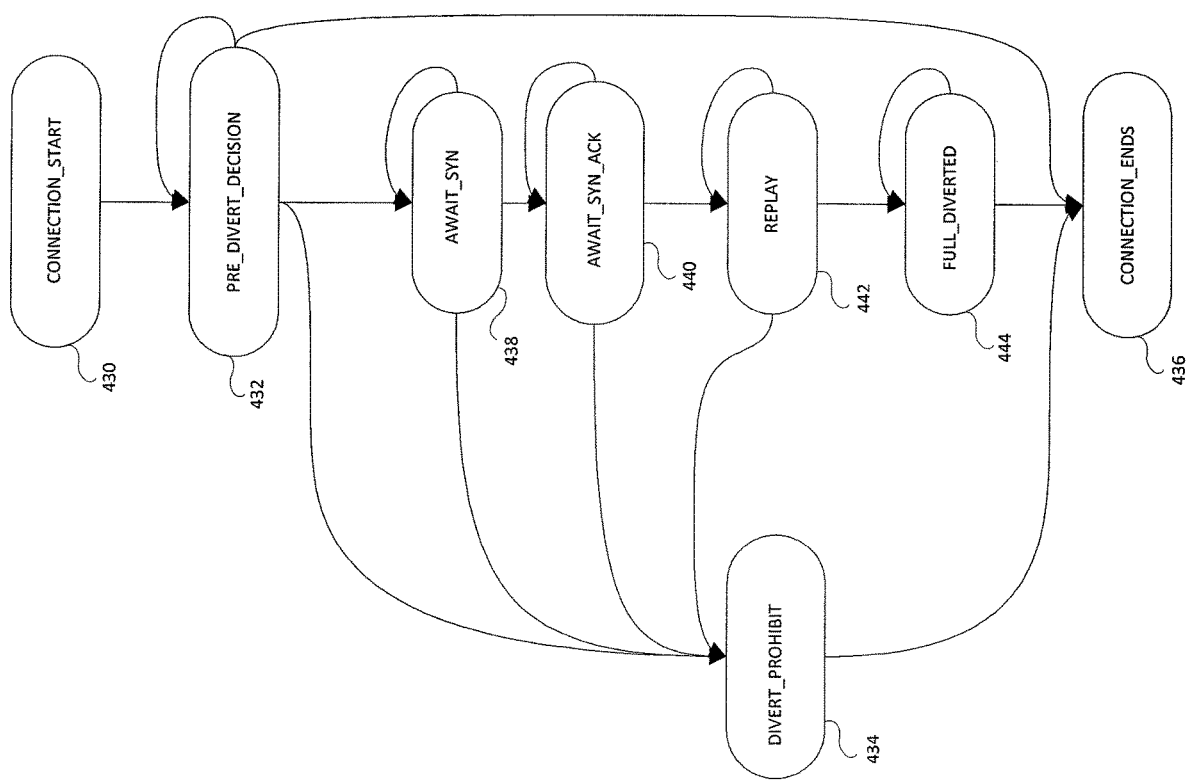
FIG. 13 illustrates example states of a full divert communication session.

In a full divert deployment, the connection states are illustrated in FIG. 13. At 430, a connection starts in "CONNECTION_START" state. At 432, the connection is transitioned to a "PRE_DIVERT_DECISION" state. While the connection stays in the "PRE_DIVERT_DECISION" state, the application protocol recognition module 314 runs pattern-matching to determine the application protocol and saves the content of packets in protocol recognition state storage 318 or the session state storage 312.

At 434, the connection may transition into "DIVERT_PROHIBIT" state from "PRE_DIVERT_DECISION" state if the divert chain manager 320 determines any indication that it is inadvisable to divert the established communication session, such as the connection having missing packets, a predetermined policy which advises that the connection will not be diverted at a later time, the connection has undivertable TCP options or the like.

At 436, a connection can move into "CONNECTION_END" state when the connection is terminated, for example, by having FIN flags for TCP packets, no packets for the connection are received within a predetermined amount of time, or the like. In some cases, the predetermined amount of time may be configurable by an operator of the system. In other cases, the predetermined amount of time may be set to, for example, 5 seconds, 30 seconds, 1 minute, 5 minutes, 1 hour, or the like.

If a connection is identified as a possible communication session to be diverted, the divert chain manager 320 will send a SYN packet to a divert host to establish a connection with the divert host. At 438, the connection is moved to "AWAIT_SYN" from "PRE_DIVERT_DECISION" state. The connection may stay in "AWAIT_SYN" state until a SYN packet is received from the divert host.

At 440, when the SYN packet is received, the divert chain manager 320 will send "SYN-ACK" packet to the divert host and move the connection to "AWAIT_SYN_ACK" state. Once a connection is in "AWAIT_SYN_ACK" state, the connection will remain in this state until it receives a SYN-ACK packet from the divert host. Once the connection receives the "SYN-ACK" packet, the divert chain manager 320 will send replayed packets, the packets that have been saved by the protocol recognition state storage 318 and have been previously transmitted to the initiator or the acceptor as part of the communication session.

Further, at 442, the connection is moved to a "REPLAY" state. Once a connection is in the "REPLAY" state, the connection will continue to remain in this state until all the replayed packets have been transmitted and the system has received acknowledgments from the service chain.

When the connection is in any of the "AWAIT_SYN", the "AWAIT_SYN_ACK", or the "REPLAY" state, if the service chain does not respond in time or the divert host sends a Reset (RST) packet, the connection will be undiverted and the connection receives the "DIVERT_PROHIBIT" state.

At 444, once all replayed packets have been received from the divert host, the divert chain manager 320 will move the connection into a "FULL_DIVERTED" state. However, if while in the REPLAY state the system 302 determines that the replayed packets have been modified, the divert chain manager 320 will undivert the connection and move the connection to the "DIVERT_PROHIBIT" state.

When a connection is in the "FULL_DIVERTED" state, the fast path module 324, with information provided from the divert chain manager 320 will bridge packets from the initiator or the acceptor to the divert host and bridge packets back from the divert host to the acceptor or the initiator. Whether to send to the initiator or the acceptor is decided based on the source and destination addresses associated with the packet. All packets in both directions are sent through the service chain such that Internet-to-subscriber packets traverse precisely the reverse path of the subscriber-to-Internet packets. It will be understood that the state names are used as examples and other states or different state names may be applied to the connection as the connection state that is stored by the system.

Figure 14:
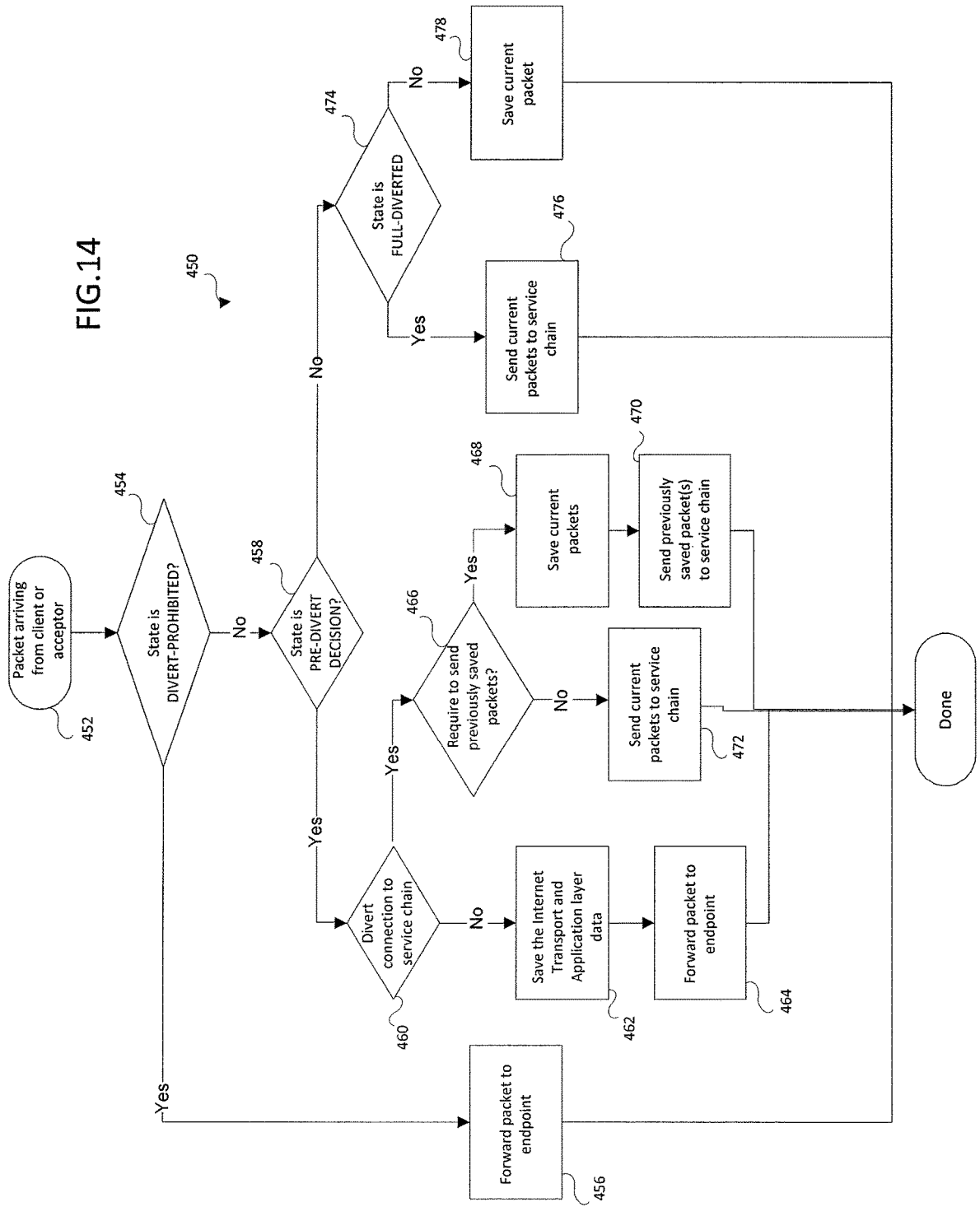
FIG. 14 is a flow chart of an embodiment of a method for full diverting an established communication session.

FIG. 14 is a flow chart of an embodiment of a method 450 for diverting an established communication session after the initial communication set up and data packets or content have been transferred between the initiator and the acceptor. FIG. 14 illustrates a packet flow if the packet is arriving from an initiator or an acceptor. At 452, the fast path module 324 receives packets from the initiator or the acceptor. At 454, the fast path module 324, with information retrieved from the divert chain manager 320, determines whether the state of the communication session or connection is the "DIVERT_PROHIBIT" state. At 456, if the state is "DIVERT_PROHIBIT", the packet will be forwarded to the endpoint.

At 458, before the traffic divert decision is made, when the connection is associated with the "PRE_DIVERT_DECISION" state, the packets are forwarded to the initiator or, the acceptor, unless there is another action to be applied, for example, blocking the packet or the like. At 460, the rule engine 316 may decide to divert the connection to a service chain. At 462, metadata, for example, the Internet, transport and application data is saved by the system. At 464, as the divert decision has not been made by the rule engine 316 the packets are transmitted to the endpoint or destination of the packet.

At 466, once the decision to divert is made, the divert chain manager 320 determines if previously saved packets are required to be sent to the service chain. At 468, if there are saved packets associated with the connection, for example the connection is in the "AWAIT_SYN" the "AWAIT_SYN_ACK" or the "REPLAY" state, the divert chain manager 320 may save the current packet. At 470, the system sends the previously saved packets to the service chain. If there were no previously saved packets to be sent, at 472, the divert chain manager 320 sends the current packet to the service chain.

At 474, the connection is reviewed to determine if the state has previously been set as "FULL_DIVERT". If it has, the packets are transmitted to the service chain, at 476. If the connection state is another state the current packet is saved, at 478.

Figure 15:
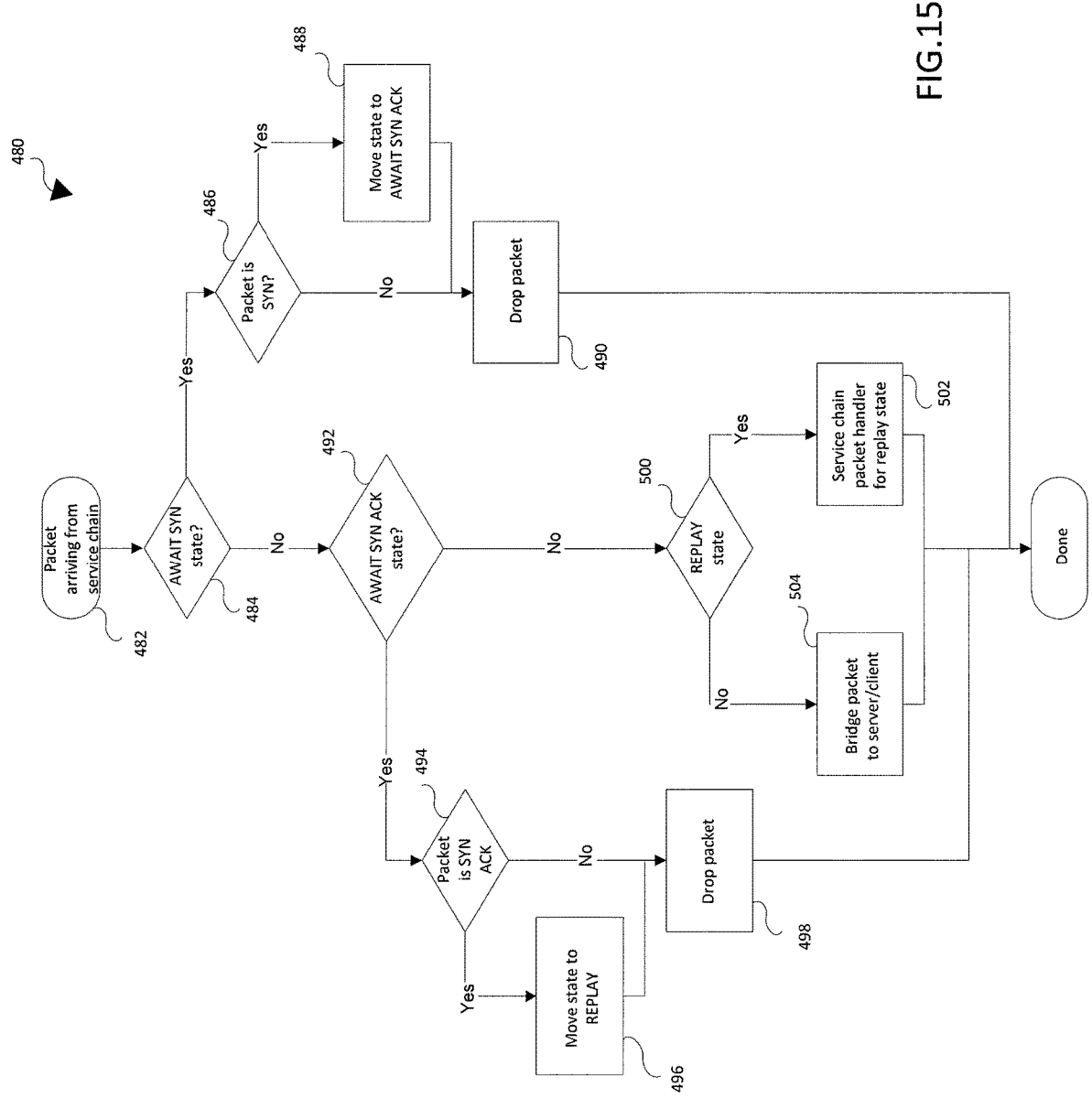
FIG. 15 is a flow chart of an embodiment of a method for a full divert of a communication session.

FIG. 15 illustrates an embodiment of a method 480 of a full divert of an established communication session where a packet is arriving from a service chain.

At 482, the fast path module 324 receives a packet from the service chain. At 484, the fast path module 324, based on data retrieved from the divert chain manager 320, determines whether the connection or communication session is currently in the AWAIT_SYN state. If the connection is in the AWAIT_SYN state, the packet is reviewed to determine whether the packet is a SYN packet, at 486.

At 488, if the packet is the SYN packet, the system 302 will send a SYN-ACK packet into the acceptor end of the service chain and move the state of the connection to the AWAIT_SYN_ACK state. At 490, if the packet is not a SYN packet or after the divert chain manager 320 has updated the state, the packet may be dropped. Not shown is a configurable timer that, if the timer reaches a predetermined threshold, the system 302 is configured to cause the SYN-ACK packet to be re-sent.

At 492, the system 302 determines if the connection is at the AWAIT-SYN-ACK state. At 494, if the state is AWAIT_SYN_ACK state, the fast path module 324 determines whether the packet is a SYN-ACK packet. At 496, if the packet is a SYN-ACK packet, the divert chain manager 320 moves the state to REPLAY state. At 498, the system 302 drops the current packet. If the current packet is not a SYN-ACK packet, the system 302 may drop or otherwise ignore the current packet.

At 500, the fast path module 324, based on data retrieved from the divert chain manager 320, determines whether the state of the connection is the REPLAY state. At 502, if the state is the REPLAY state, the system 302 may perform a service chain packet handling procedure for the replay state. Based on whether the packet from the divert host contains data stored in the stored stream, the service chain packet handler may remove data from the stored stream, undivert connections, drop packets or bridge packets back to the initiator and/or the acceptor as detailed, or the like.

At 504, if the state of the connection is not the REPLAY state, it is determined that the state is FULL-DIVERT and the fast path module 324 will send the packet to the acceptor or the initiator according to the destination IP address.

Figure 16:
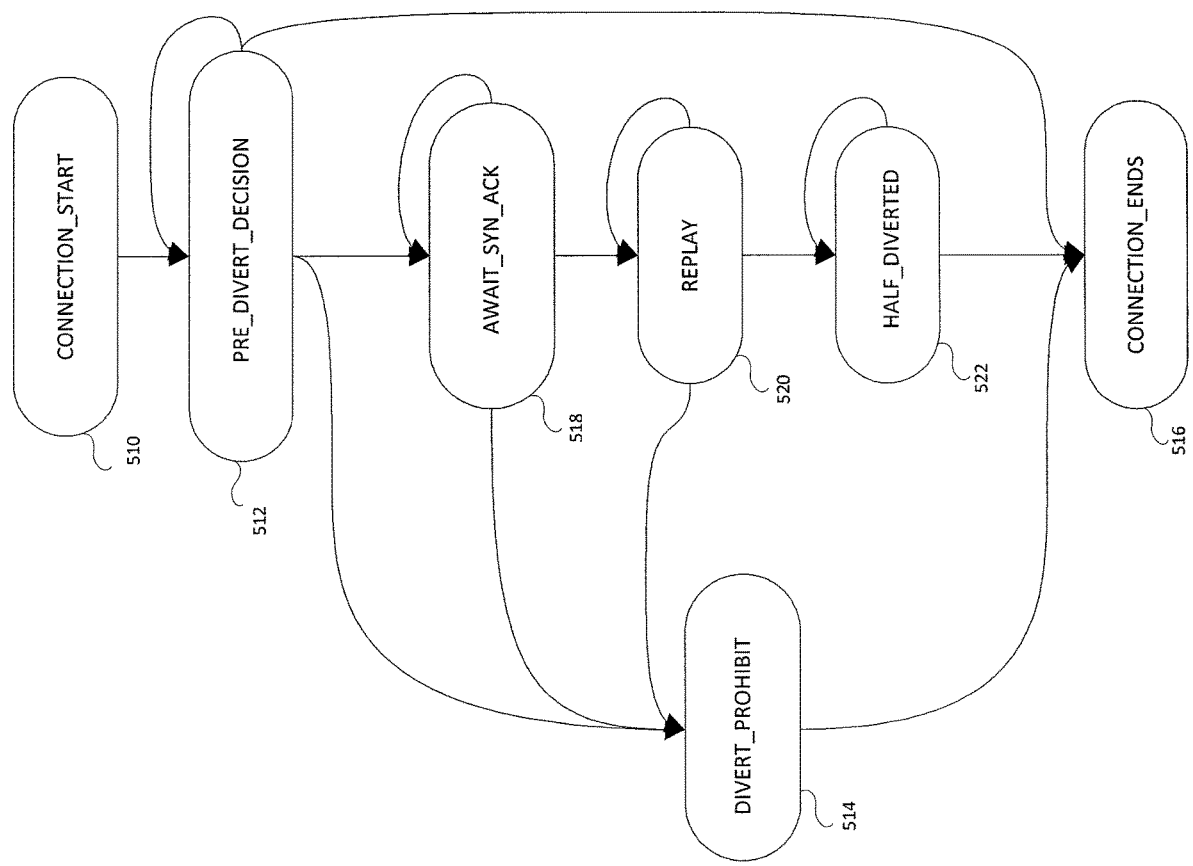
FIG. 16 illustrates example states of a half divert communication session.

FIG. 16 illustrates example states available for a communication session or connection in a half divert example.

At 510, once a connection starts, the divert chain manager 320 assigns the connection in an initial "CONNECTION_START" state. At 512, the divert chain manager 320 may transition the connection into a "PRE_DIVERT_DECISION" state. While the connection is in "PRE_DIVERT_DECISION" state, the protocol recognition state storage 318 will save the content of the packets from the initiator and the acceptor. The protocol recognition state storage 318 may be further configured to save other metadata related to the received packets At 514, the divert chain manager 320, based on information received from the fast past module 324, may move the connection into "DIVERT_PROHIBIT" state from "PRE_DIVERT_DECISION" state if there are indications that it is inadvisable to divert the connection, such as missing packets, a policy to not divert the connection, the connection has undivertable TCP option, or the like.

At 516, the connection may move into "CONNECTION_END" state when connection is terminated, for example, by receiving FIN flags for TCP packets, receiving no packets related to the connection within a configurable amount of time, or the like.

At 518, once a policy decision has selected the connection to be diverted, the divert chain manager 320 sends a SYN packet to the divert host and the connection is moved to an "AWAIT_SYN_ACK" state. At this point, the connection will stay in "AWAIT_SYN_ACK" state until the fast path module 324 receives a SYN-ACK packet from the divert host. Not shown is a timer configured to initiate a re-transmittal of the SYN packet, if the timer reaches a predetermined threshold. Once the fast path module 324 receives "SYN-ACK" packet, the divert chain manager 320 sends replayed packets from the initiator (the packets that have been transmitted between the initiator and the acceptor) and moves the connection to a REPLAY state, at 520.

When the connection is in any of the "AWAIT_SYN_ACK" state or the "REPLAY" state, if the divert host does not respond along the service chain within a predetermined amount of time or sends an RST packet, the connection will be undiverted and connection will move to "DIVERT_PROHIBIT" state, at 514. In some cases, the predetermined amount of time may be set by an operator of the system. In other cases, the system may set the predetermined amount of time to, for example, 100 milliseconds, 1 second, 5 seconds, 1 minute, or the like.

At 520, once the connection is in REPLAY state, the divert chain manager 320 will continue to remain in this state until all replayed packets from the initiator have been acknowledged by the service chain and all of the saved packets from the acceptor have been sent by the service chain and received by the divert chain manager 320. Once all replayed packets have been acknowledged and transmitted, the divert chain manager 320 will move the connection into a "HALF_DIVERTED" state, at 522. In some cases, the divert chain manager 320 may also send an RST packet to the acceptor. If the system determines that the replayed packets have been modified, the divert chain manager 320 will undivert the transport layer connection and move the connection to the "DIVERT_PROHIBIT" state.

In this example, when the transport layer connection is in "HALF_DIVERTED" state, the fast path module 324, based on data received from the divert chain manager 320, will bridge packets from the initiator to the divert host and bridge packets back from the divert host to the initiator (allowing the divert host to act as the acceptor in the connection). In other cases, the divert host may act as the initiator in the connection.

Figure 17:
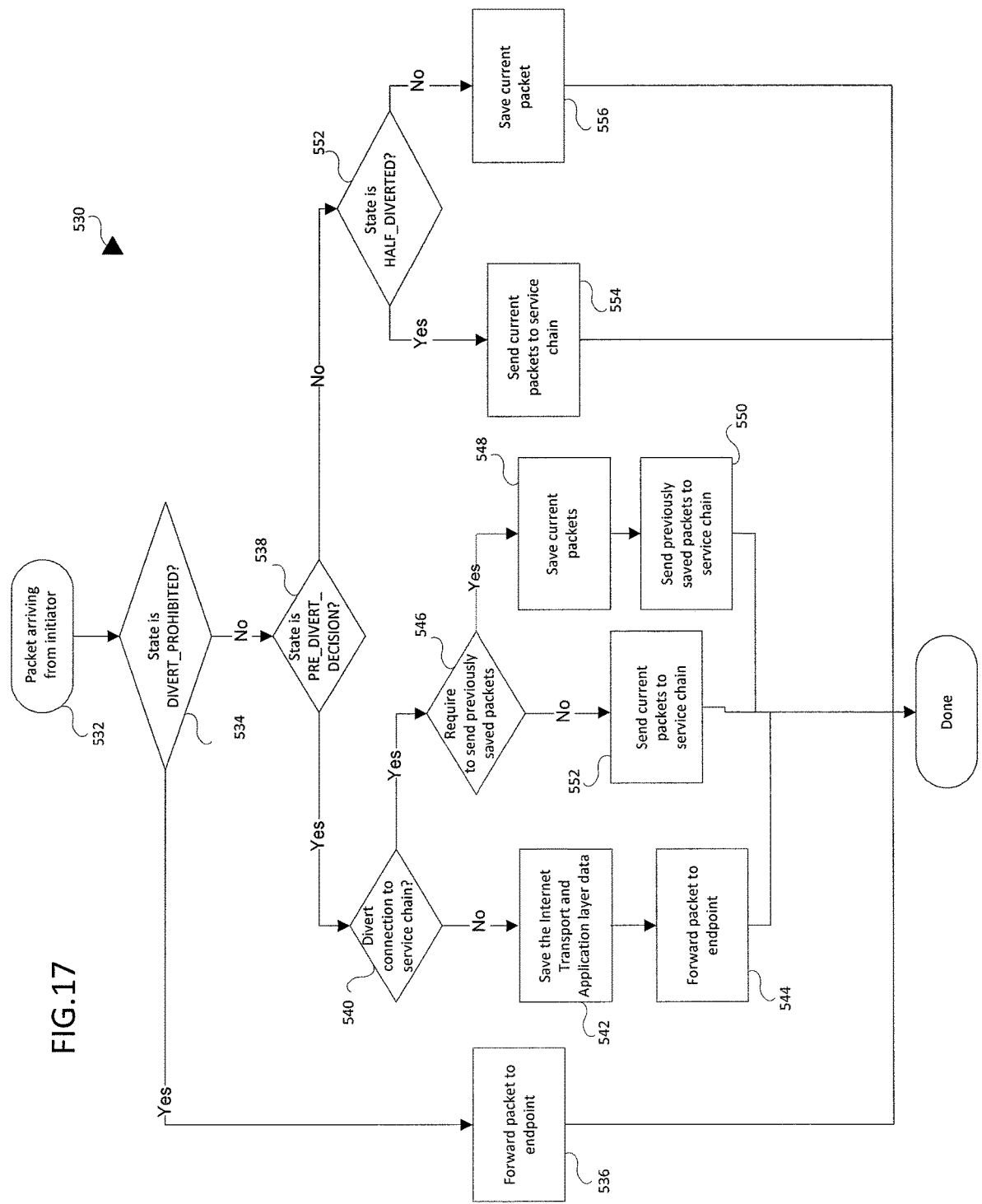
FIG. 17 is a flow chart of an embodiment of a method for half diverting an established communication session.

FIG. 17 is a flow chart of an embodiment of a method 530 for diverting an established communication session, according to a half divert deployment. FIG. 17 illustrates a packet flow through the system 302 wherein the packet is originating from an initiator or an acceptor.

Similar to the full divert deployment, a packet arrives from the initiator, at 532. At 534, the system determines whether the state of the communication session or connection is the "DIVERT_PROHIBIT" state. At 536, if the state is "DIVERT_PROHIBIT" the packet will be forwarded to the endpoint.

At 538, before the traffic divert decision is made (when the connection is associated with the "PRE_DIVERT_DECISION" state), the packets are forwarded to the endpoint, either the initiator or the acceptor. At 540, the rule engine 316 may review the packet data to determine whether the connection is a candidate to be diverted to a service chain. At 542, the Internet, transport and application data of the packet is saved by the system. At 544, as the divert decision still has not been made, the packets are sent to the endpoint.

At 546, once the decision to divert is made, the system determines if previously saved packets have been sent to the service chain. At 548, if there are saved packets associated with the connection, for example the connection is in the "AWAIT_SYN" the "AWAIT_SYN_ACK" or the "REPLAY" state, the divert chain manager 320 may save the current packet. At 550, the system sends the previously saved packets to the service chain. If there were no previously saved packets to be sent, at 552, the divert chain manager 320 sends the current packet to the service chain.

At 552, the connection is reviewed to determine if the state has previously been set as "HALF_DIVERT". If it has, the packets are sent to the service chain, at 554. If the connection state is another state the current packet is saved, at 556.

Figure 18:
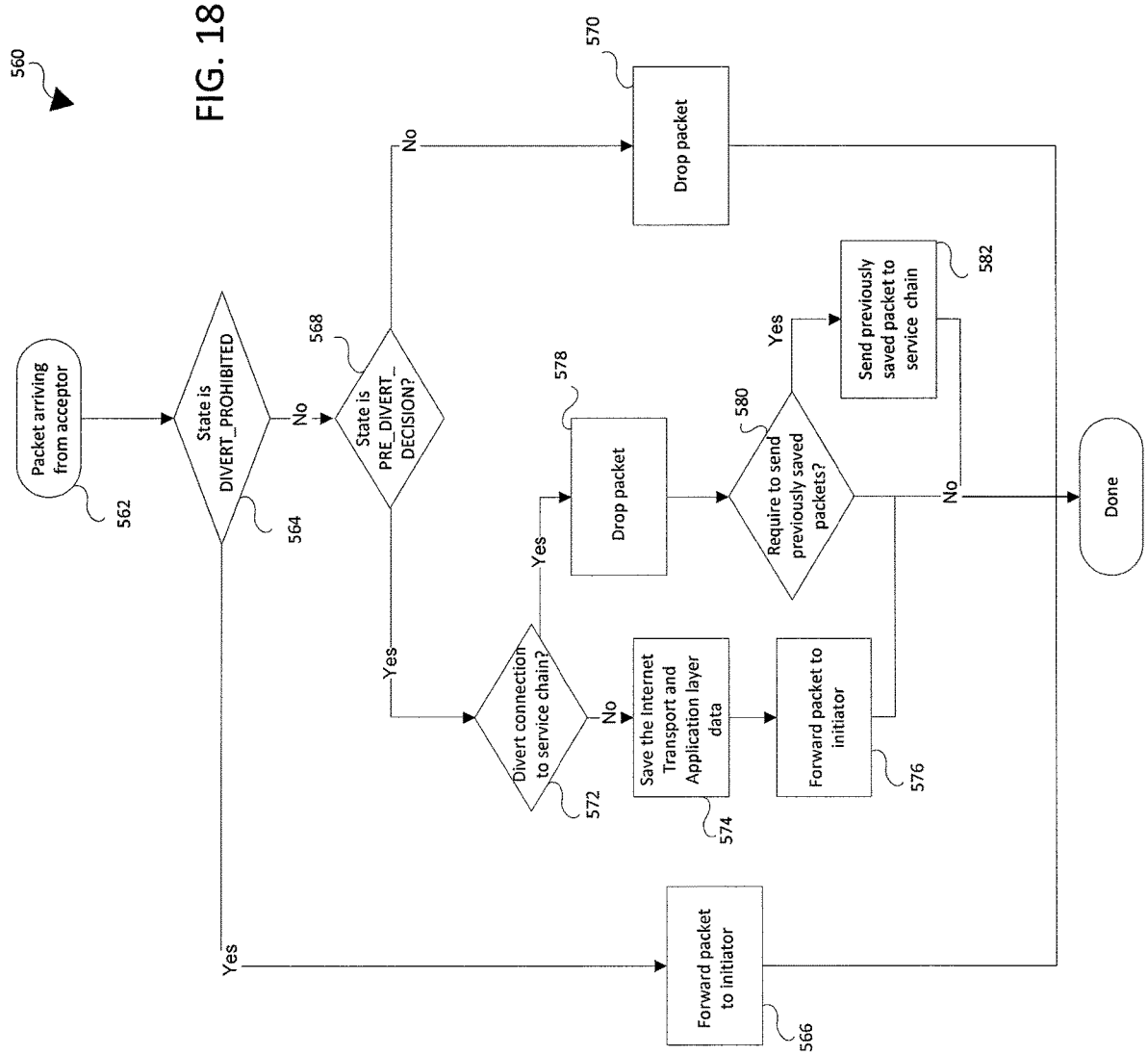
FIG. 18 is a flow chart of an embodiment of a method for half divert of a communication session.

FIG. 18 illustrates an embodiment of a method 560 of a half divert of an established communication session with a packet arriving from the acceptor. At 562, a packet is received by the system from the acceptor. At 564, the fast path module 324, based on data provided by the divert chain manager 320, reviews the state of the connection to determine is the state is DIVERT_PROHIBIT. At 566, the fast path module 324 sends the packet to the initiator if the state is DIVERT_PROHIBIT.

At 568, the fast path module 324 based on information provided by the divert chain manager 320, reviews the state to determine whether the state is PRE_DIVERT_DECISION. At 570, packets from the acceptor are dropped by the fast path module 324, if the connection is already diverting to the service chain (i.e., AWAIT_SYN_ACK, REPLAY or HALF_DIVERTED state).

At 572, if the connection is not already diverted and is in the PRE_DIVERT_DECISION state, then the system determines whether the connection is a candidate to be diverted. At 574, if the system 302 does not determine to divert the connection to the service chain, the system saves the Internet, transport and application layer data. At 576, the system 302 then forwards the packet to the initiator.

At 578, if the fast path module 324, based on data provided by the divert chain manager 320, determines the connection is to be diverted, the fast path module 324 drops the packet from acceptor. At 580, the divert chain manager 320 then determines whether divert chain manager 320 has previously saved packets to send to the service chain, including a TCP handshake. At 582, if there are packets to send, the divert chain manager 320 will send the previously saved packets to the service chain and change the state to AWAIT_SYN_ACK state.

Figure 19:
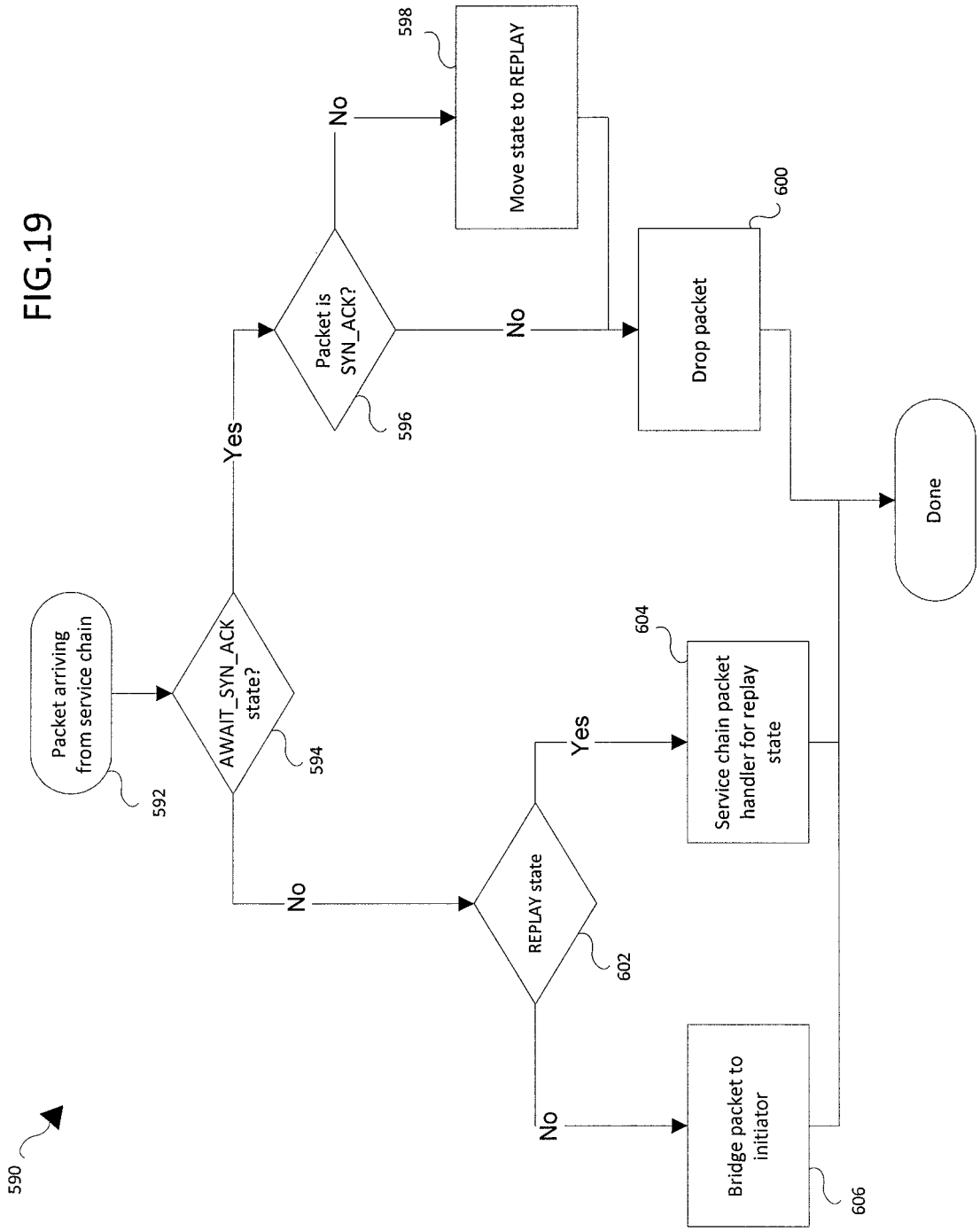
FIG. 19 is a flow chart of another embodiment of a method for half divert of a communication session.

FIG. 19 illustrates an embodiment of a method 590 of a half divert of an established communication session where a packet arrives from a service chain.

At 592, a packet is received by the system 302 from the service chain. At 594, the fast path module 324 determines if the state of the communication session is the AWAIT_SYN_ACK state. At 596, if the state is AWAIT_SYN_ACK, the system will check whether the packet is a SYN-ACK packet. At 598, if the packet is a SYN-ACK packet, the divert chain manager 320 updates the state of the connection to the REPLAY state and, at 600, drops the current packet. At 600, if the current packet is not a SYN-ACK packet, the fast path module 324 may drop the current packet.

At 602, the system determines whether the connection state is the REPLAY state. At 604, if the system determines that the connection state is the REPLAY state, the system performs the service chain packet handling procedure for the REPLAY state.

At 606, if the state is not the REPLAY state, the divert chain manager 320 determined that the state is HALF-DIVERT and the fast path module 324 will bridge the packet to the initiator.

Prior to a divert decision when the communication session is (i.e., in the PRE_DIVERT_DECISION state), packets may be been saved in preparation for a potential divert decision.

When the policy decision to divert is made, the previously saved packets are processed to ensure that it is safe to divert: there must be complete saved content for all bridged application layer network data, in order to safely divert the communication session where content or data packets have been exchanged. The system 302 replays the data to the service chain and ensures that the packets returned from the service chain are equivalent to the formerly bridged packets prior to diverting the communication session.

Figure 20:
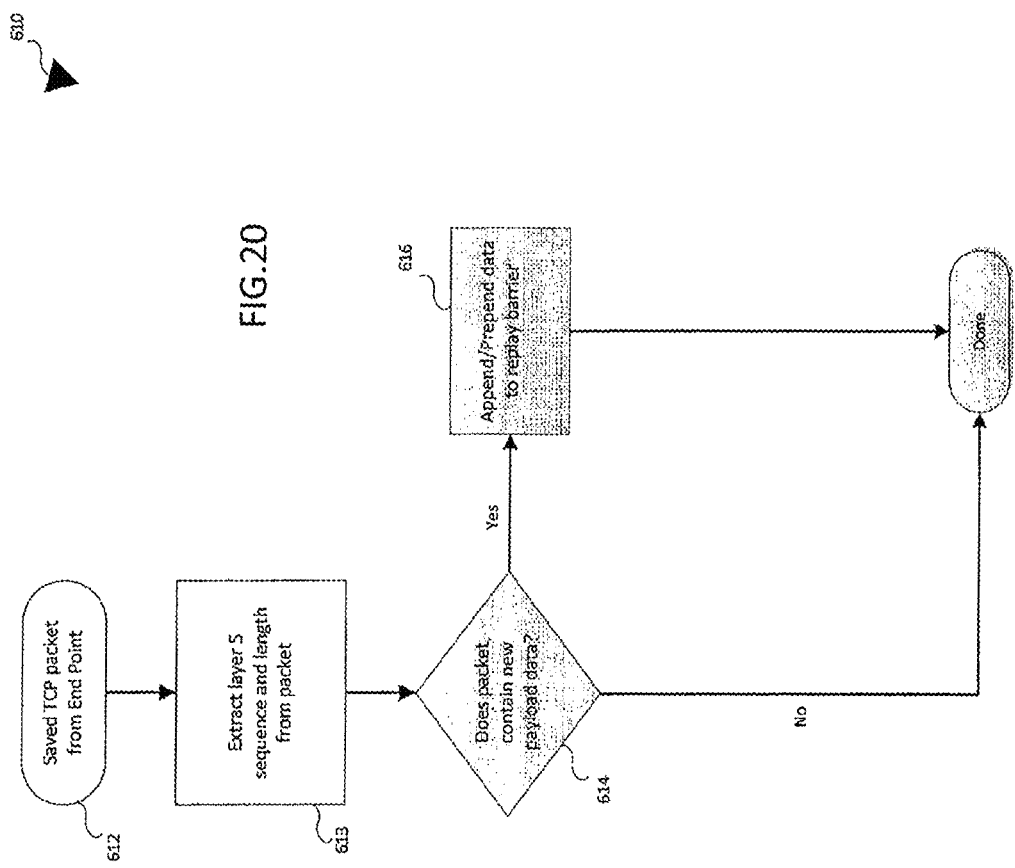
FIG. 20 is a flow chart illustrating an embodiment of a method of saving packets being processed into a contiguous list.

FIG. 20 illustrates an embodiment of a method 610 for saving packets for processing into a contiguous list.

Then the connections state goes from PRE_DIVERT_DECISION to AWAIT_SYN in the case of full divert, or from PRE_DIVERT_DECISION to AWAIT_SYN_ACK in the case of half divert, if the list does not contain contiguous data from all formerly bridged packets, then the connection is marked as DIVERT PROHIBITED and the connection will not be diverted.

When replaying data to the service chain, the divert chain manager 320 will replay data from the same endpoint within the same replay transactions before the divert chain manager 320 will replay data from the other endpoint within the same replay transactions. A replay transaction is defined as one endpoint sending data in response to data from the other endpoint. In the case of full divert, the system 302 will only replay packets from the next transaction when all the expected packets from the previous transactions have been sent back from the divert host. In the case of half divert, the system 302 will only replay packets from the next transaction when all the initiator packets from the current transactions have been acknowledged and all the acceptor packets from the current transaction have been sent back from the divert host. It is intended that by observing the transactions it is more likely to avoid confusing the endpoint with data that may break causality or timing assumptions of the protocol.

The reason why module 320 can replay multiple packets from the same endpoint without waiting is that it will reduce the latency of the system. The reason why module 320 needs to wait before sending packets from the other endpoint is that i) Divert host's TCP stack may expect packet's sequence/acknowledge number to match and ii) The endpoint's content is usually based on information provided by the other endpoint's content. Hence, divert host may be confused if content is out of order.

At 612, the divert chain manager 320 will review the saved TCP packet from the endpoint. At 613, the system 302 will extract the layer5 sequence and length from the packet. At 614, the divert chain manager 320 will review the sequence and length with respect to previous saved sequences and length to determine if there is new payload data. At 616, the divert chain manager 320 will append the data to a replay barrier, which may be saved and stored in a divert chain manager 320 or in a state storage operatively connected to the divert chain manager 320.

The replay barrier is defined as all the packets that have been transmitted to the initiator and the acceptor prior to diverting the communication session. Packets in the replay barrier are not replayed to the initiator or acceptor endpoint (from the divert host). The packets are reviewed by the divert chain manager 320 to determine whether the divert host modified any of the content of the packets. If the packets have been modified, the communication session will not be diverted because the acceptor and/or the initiator have already seen these packets and already have a record of the information contained within the packet. Diverting the communication session to a divert host that has modified the packets may cause the initiator or acceptor to become confused with respect of the transmission. For example, as shown in FIG. 11, if the divert host modifies the GET request from index.html to change.html and the system does not undivert the connection and continues to replay the content "MIME type:video". Then it is unclear whether the content is passed on web page "index.html" or "change.html". The replay barrier may be stored as the ending TCP sequence number of the packet which caused the decision to divert the connection.

Figure 21:
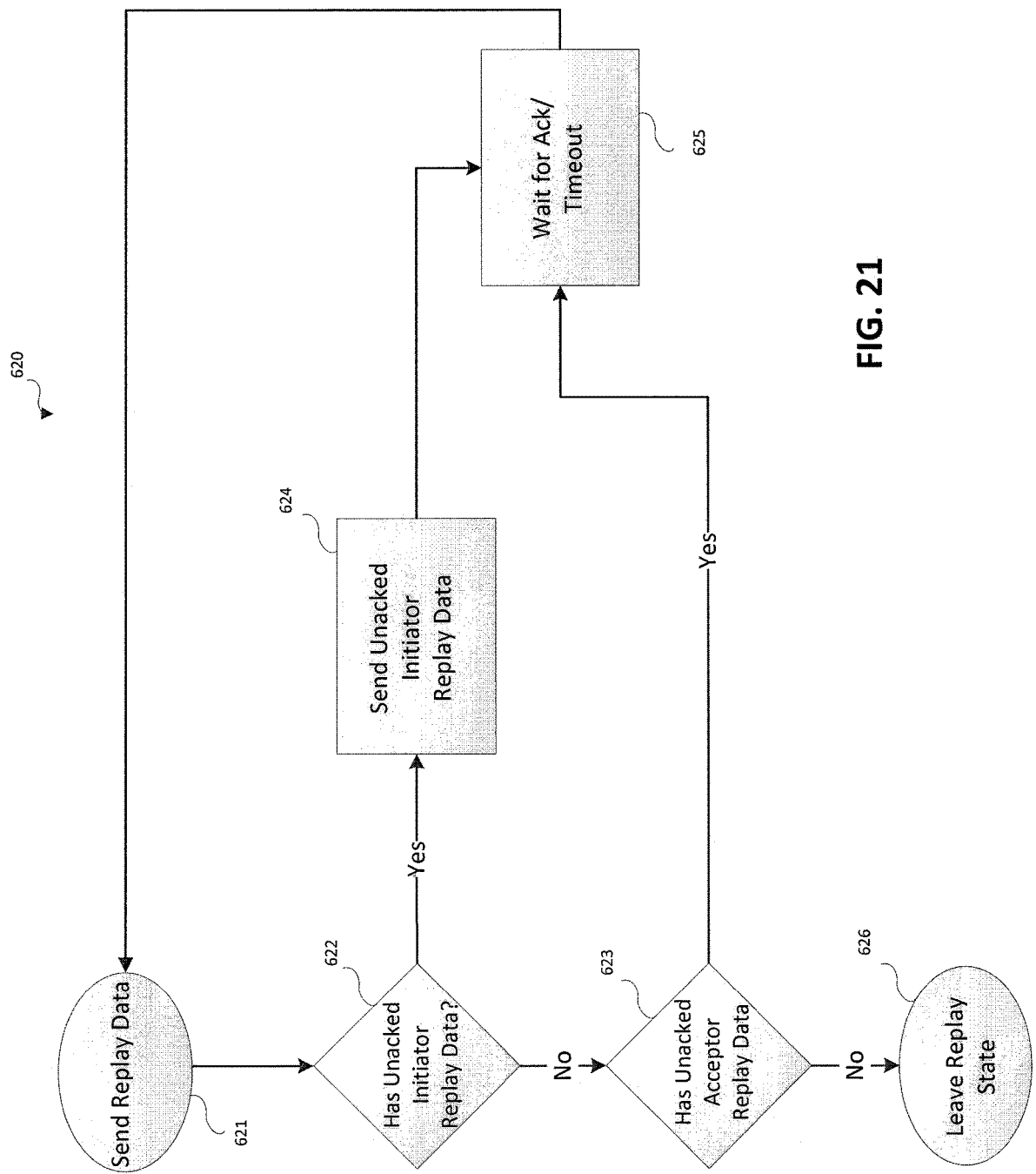
FIG. 21 is a flow chart illustrating a method for replaying data for half divert.

FIG. 21 is a flow chart illustrating an embodiment of a method 620 of replaying a signal transaction for half divert. The system 302 sends replay data to the service chain, at 621. At 622, the divert chain manager 320 determines if there is any saved initiator data that has not been acknowledged by the service chain. At 624, if there is unacknowledged data, the data will be sent to the service chain. The divert chain manager 320 waits for an acknowledgement or for a predetermined threshold of time, for example, 100 milliseconds, 1 second, 10 seconds, 30 seconds, 1 minute, or the like. If the system reaches the predetermined threshold of time, the divert chain manager 320 will determine the service chain has timed out and will undivert the connection or otherwise determine what to send next.

At 623, the divert chain manager 320 determines whether there is any unacknowledged acceptor replay data to be resent by service chain. At 625, the divert chain manager 320 waits for an acknowledgment or a predetermined amount of time. No further data will be sent until either a TCP ACK is received from the service chain, or a timeout occurs, at which point the same logic will be used to determine what to send next. At 626, the system will leave the replay state.

Figure 22:
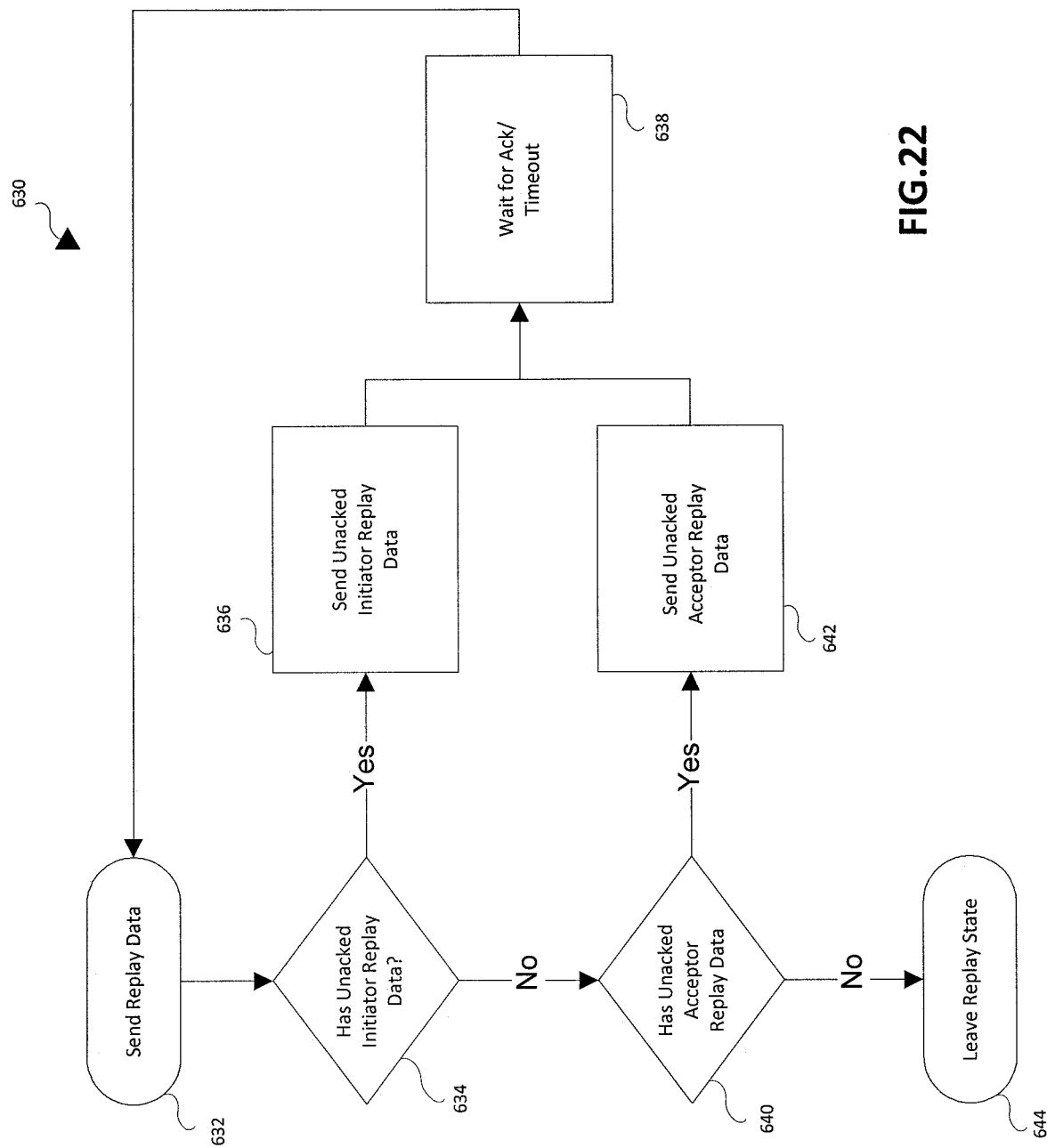
FIG. 22 is a flow chart of an embodiment of a method for replaying a single transaction.

FIG. 22 is a flow chart illustrating an embodiment of a method 630 of replaying a single transaction for full divert. The divert chain manager 320 sends replay data to the service chain, at 632. At 634, the divert chain manager 320 determines if there is any saved initiator data that has not been acknowledged by the service chain. At 636, if there is unacknowledged data, the data will be sent to the service chain. The divert chain manager 320 waits for an acknowledgement or for a predetermined threshold of time, for example, 100 milliseconds, 1 second, 10 seconds, 30 seconds, 1 minute, or the like. If the system reaches the predetermined threshold of time, the divert chain manager 320 will determine that the service chain has timed out and will undivert the connection or otherwise determine what to send next.

At 640, the divert chain manager 320 determines whether there is any unacknowledged acceptor replay data to be sent. At 642, the divert chain manager 320 sends the unacknowledged acceptor replay data if there is some outstanding. At 638, the divert chain manager 320 waits for an acknowledgment or a predetermined amount of time. No further data will be sent until either a TCP ACK is received from the service chain, or a timeout occurs, at which point the same logic will be used to determine what to send next. At 644, the system 302 will leave the replay state.

While replaying to the service chain all packets formerly exchanged between initiator and acceptor end-points, new packets may be received from either end-point. These packets are held until the replaying is completed. After ensuring the service chain has not modified any of the application data in its responses, the divert chain manager 320 then replays the newly held packets to the service chain. In this case, these packets have not yet been received or acknowledged by the peer/the corresponding endpoint (as the packets have been held by the system). Therefore, waiting for an acknowledgement (ACK) from the service chain is unnecessary, as the end-points can retransmit these packets if they get dropped anywhere in the network.

Figure 23:
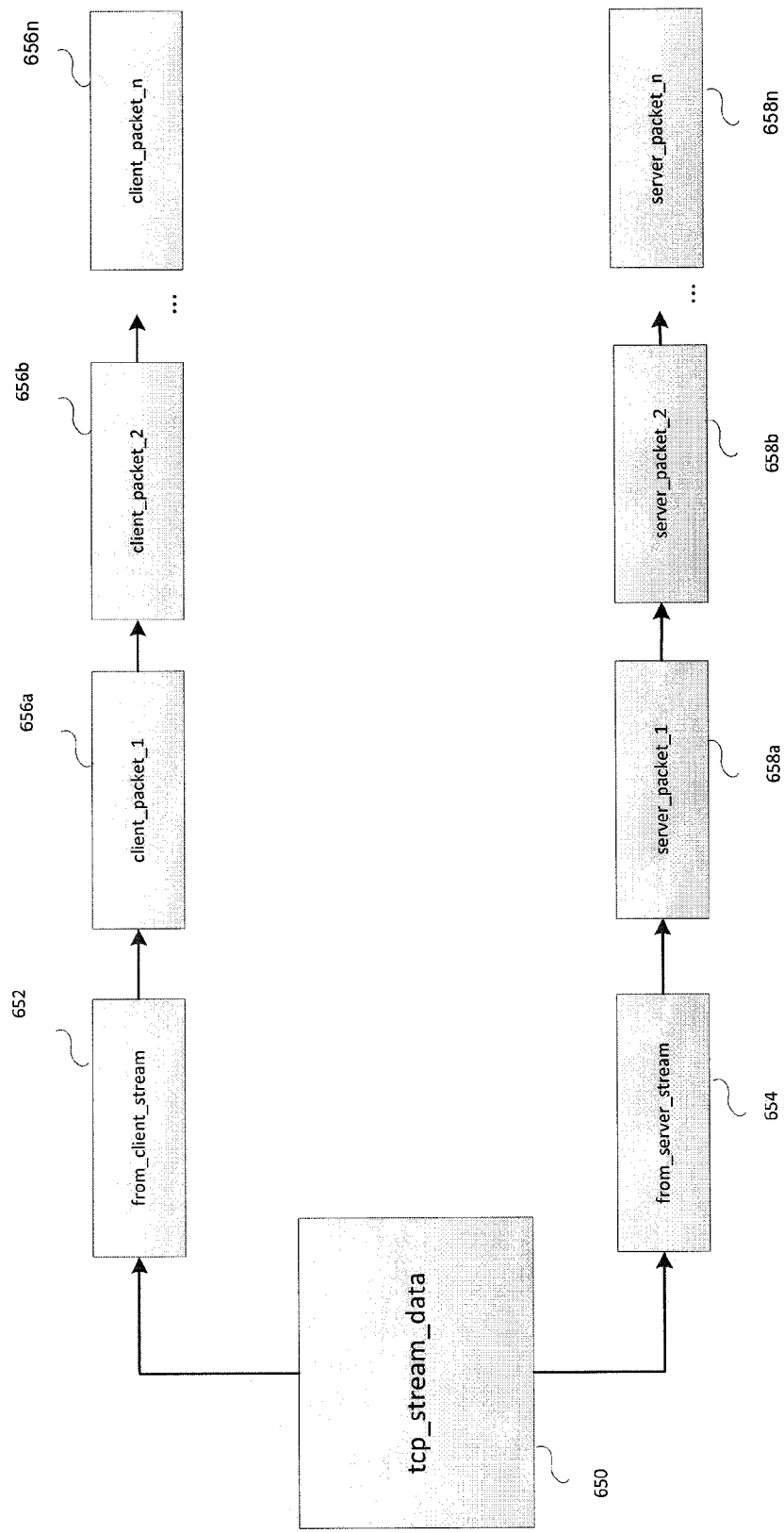
FIG. 23 illustrates example data structures for saving replay packets.

FIG. 23 illustrates an example of how the replay data is arranged and accessed. One skilled in the art will recognize there are many functionally equivalent data structures.

In an example, the 'tcp_stream_data' structure 650 is used to contain a collection of replay data/packets. The 'tcp_stream_data' structure contains two lists of packets which are used to capture an entire set of replace packets (in a tcp_streams structure); one for upstream traffic, shown as a from_client_stream structure 652, and the other for downstream traffic, shown as a from_server_stream structure 654.

The tcp_stream_data structure 650 contains a TCP sequence number which defines the end of the replay packets which the system 302 will retransmit if the connection is diverted to a sequence chain. In other words, the 'replay_sequence' contains the last sequence number of the packets, which have already been forwarded to the connection end-point. Anything prior to this sequence number is intended to be reviewed by the system 302, to be received by the service chain. Further, the system 302, reviews the packets in coordination with packets received from the service chain to determine whether the service chain has modified any application layer data in the response.

Each list of packets (from_client_stream 652 and from_server_stream 654) may contain a plurality of packet descriptors 656 and 658 (client_packet_1 656a, server packet_1 658a, client_packet_2 656b, server_packet_2 658b, etc. . . . )

Each packet descriptor 656 or 658 contains a copy of the original packet data starting from the IP (layer3) layer. Upon reception of a packet, which is to be saved, the packet's layer3 data is copied, and saved into a packet descriptor structure, which is linked, in TCP sequence order, into the appropriate packet list. If the packet is a packet which has already been bridged, then the tcp_stream_data's replay_sequence will be updated to include the packet and sequence number.

While the data in these packets may overlap. Entirely overlapping packets (retransmissions) need not be added to the collection.

Each packet descriptor is intended to include a starting sequence TCP number for the packet it references. Further, it is intended that each packet descriptor include a layer5 length, which contains the length of unique layer 5 bytes in the packet. In some cases, retransmitted or overlapping bytes are not counted.

Each packet descriptor may further include a layer5 offset field, which is the offset in the packet to the first 'unique' byte of layer5 (application layer) data. In the event of adjacent packets with overlapping data, the layer5_offset points beyond the overlapping data. In this way, it is possible to traverse the entire layer5 stream, without overlap, by iterating over the packet descriptor structures, and extracting 'layer5_length' bytes from each node, starting at 'layer5_offset'

Each packet descriptor may further include a count of any layer4 data which contributes to the TCP sequence number (in other words, this length will be incremented if the packet contains a TCP SYN or FIN flag).

An example of how overlapping packets are maintained can be seen in FIG. 24. In this example, the first 60 bytes of Packet 2 overlap the last 60 bytes of Packet 1. To allow for easy traversal of the entire layer5 conversation, the stored layer5 offset of packet 2 is adjusted to the first unique byte (sequence 120, or 60 bytes into the layer 5 payload of packet 2). Packet 3 contains all new layer5 data, and therefore has its layer5_offset pointing directly to the start of the layer5 data in that packet.

While the system 302 is intended to ensure that the service chain does not modify any formerly forwarded packets, the fast path module 324 may receive new packets from either the initiator or the acceptor endpoints. These packets are saved in the tcp_stream_data structure's 650 packet list for later processing. Because the packets have not yet been forwarded to the peer endpoint, the replay_sequence is not updated to include them. In some cases, the system 302 may not be responsible for transmitting these packets (the endpoints will retransmit them as needed) however the system may save these packets, and forward them to the service chain after the other packets have been replayed in sequence.

Figure 25:
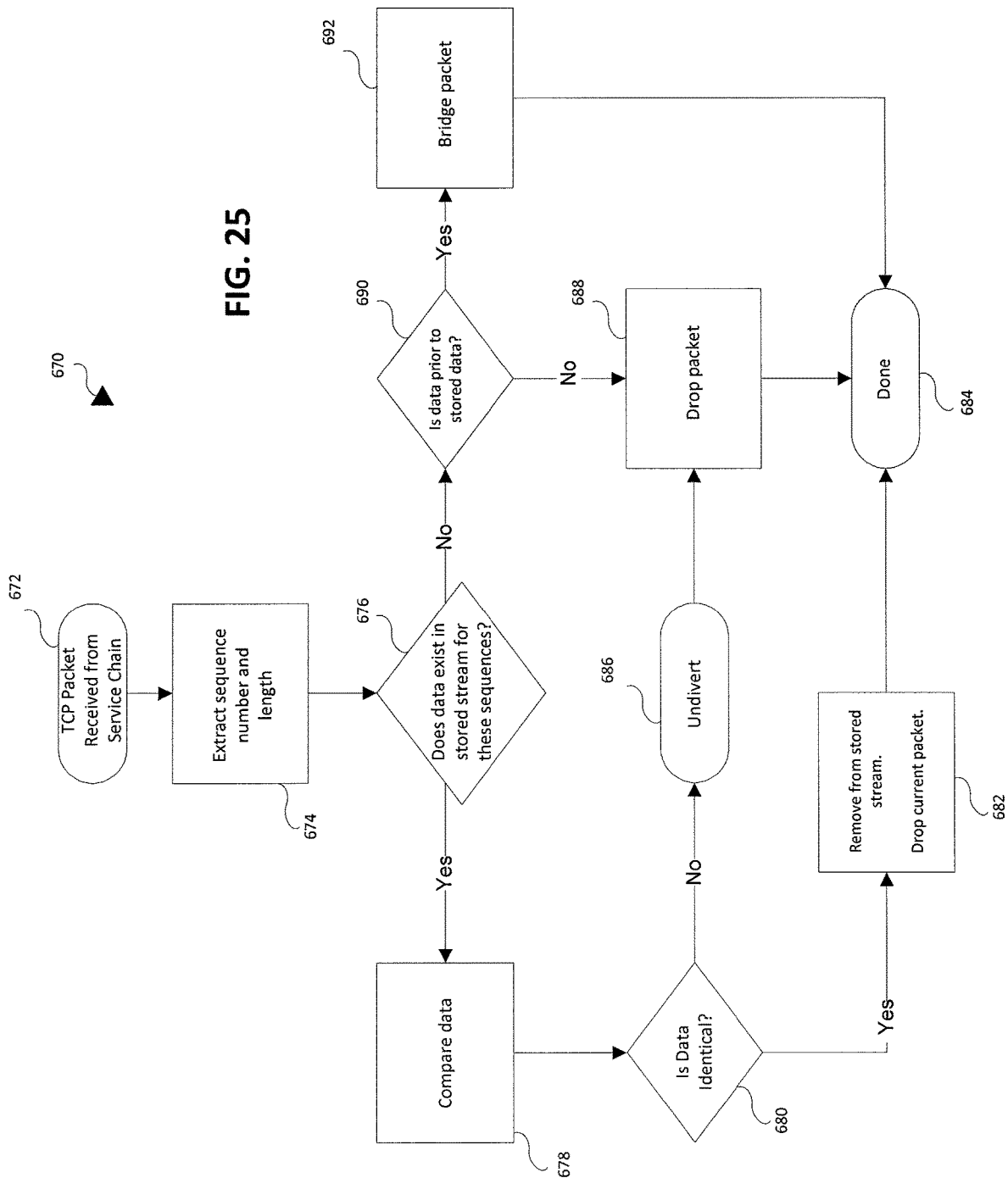
FIG. 25 is a flow chart of an embodiment of a method for service chain packet handler for a replay state.

FIG. 25 illustrates an embodiment of a method 670 for a service chain packet handler processing a packet. The method 670 illustrates the flow of events when a packet is received from the service chain, while the connection is in a replay state. In the replay state, there exists replay data which the divert chain manager 320 is intended to verify against data received from the service chain, prior to the connection becoming diverted.

At 672, a packet is received by the fast path module 324. At 674, once the fast path module 324 has received the packet, the TCP sequence number and layer5 lengths are extracted.

At 676, the divert chain manager 320 determines whether the data exists in the stored stream for the received sequences. At 678, if data in the 'tcp_stream_data' structure 650 overlaps with this packet's layer5 payload, the lengths of the overlapping data are compared. At 680, the divert chain manager 320 determines whether the data is identical or equivalent to the stored data.

At 682, if the data is equal, then it means the service chain has responded without modifying the stored/historical data, and the stored data may be removed from the tcp_stream_data structure 650. At 684, the current packet has already been bridged to the endpoint, accordingly the packet may be dropped by the fast path module 324. The divert chain manager 320 may wait to receive for the next packet in the communication session.

At 686, if the data in the packet has been modified, then the divert chain manager 320 determines that the transport layer connection is not a candidate to be diverted, as the service chain has modified a packet which has already been bridged to the endpoint. The system undiverts the connection and allows the original initiator and acceptor endpoints to continue the undiverted connection. At 688, the modified packet is dropped.

At 690, if there is no data in the tcp_stream_data structure 650 that overlaps with the current packet's layer5 payload, then the system 302 inspects whether this packet's sequence puts the packet prior to the saved content or after the saved content.

At 692, if the current packet is prior to the saved data, then generally, the divert chain manager 320 will assume the packet is a retransmission of content which the divert chain manager 320 may have already verified. This may be a retransmission and therefore the packet can be safely bridged.

At 688, if the current packet is after the saved data, then the system 302 is configured to drop the packet. Packets in the replay buffer must be received and verified before any further packets can be bridged.

While not depicted in FIG. 25, if a packet contains both data in the replay buffer, and new data, the packet may be split in two. The data in the replay buffer will be compared, and the remaining data will either be saved for transmission after all replay data have been confirmed, or bridged immediately if no more replay data exists.

Established communication sessions or connections may need to be undiverted if the divert host is unresponsive, contains incompatible TCP options, transmits different application layer data than what has already been forwarded to the initiator or the acceptor, or for other reasons. Connections may generally be undiverted any time before the system 302 has bridged any packets from the service chain back to the initiator or the acceptor.

To undivert a connection, the fast path module, based on data provided by the divert chain manager 320, is intended to simply transmit the saved packets without any modification of data. The packets have been saved by the system but have not been forwarded to the acceptor or the initiator. In addition, for TCP connection, the divert chain manager 320 may send an RST packet to the service chain to stop future communication.

A timer is associated with each connection and may be configured to a predetermined threshold amount of time to determine whether the connection has timed out. The timer may be configurable by a system operator or may be preset to a threshold, for example, 100 milliseconds, 1 second, 30 seconds, 1 minute, 5 minutes, or the like. In one case, each time a packet arrives from the initiator, the acceptor or the divert host, the system 302 restarts the associated timer, such that the timer is intended to represent an idle time of the connection.

Figure 26:
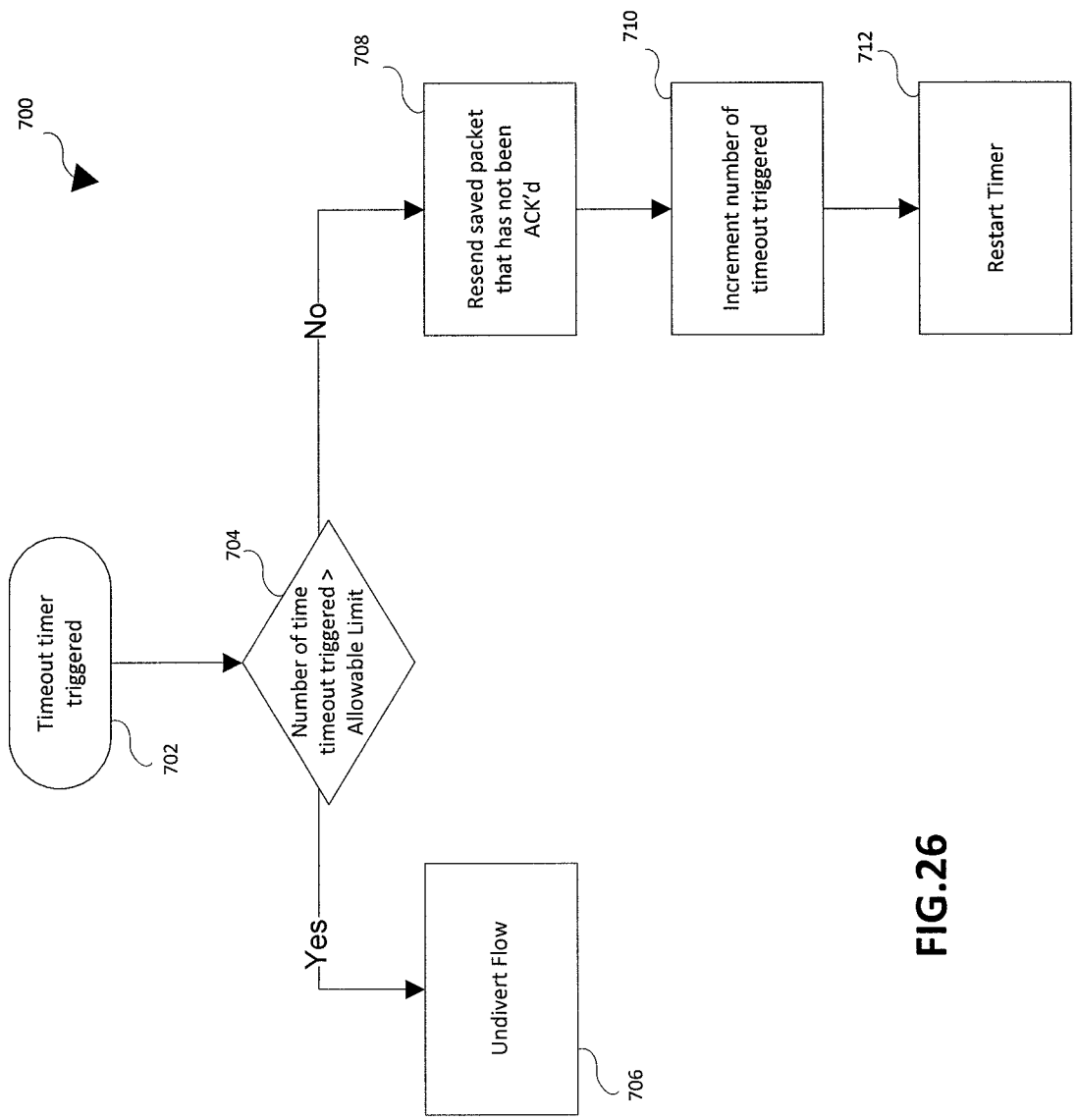
FIG. 26 is a flow chart of an embodiment of a method activated upon a timeout trigger.

FIG. 26 illustrates an embodiment of a method 700 of a timeout event. At 702, a timeout timer is triggered. At 704, the divert chain manager 320 will determine whether the number of times the timeout triggered is larger than a predetermined limit, for example 1, 2, 5, 10, 50 or the like. The limit may be configured by a system operator, or may be predetermined by the system. At 706, if the number of times the timeout timer has been triggered is above the predetermined limit, then the connection is undiverted. At 708, as the number of times the timeout timer has been triggered is below the predetermined limit, the divert chain manager 320 resends the next SYN, SYN-ACK or data packet that has not been acknowledged. At 710, the number of timeouts triggered is incremented by one. At 712, the timer is restarted.

In some cases, where one of the service chain element acts as the acceptor or the divert host, the sequence and acknowledgement numbers may need to be remapped.

In the case where the TCP connection has timestamp options, the timestamp value (TSval) and echo reply (TSecr) values may need to be remapped.

In an example, when a packet comes in from the initiator and the packet has a TCP timestamp option field, the fast path module 324 will save the option timestamp value (TSVal) as a property "last TSVal from the initiator" in the session state storage 312 if the current packet's TSVal is higher than the TSVal in the session state storage 312.

When a packet comes in from the acceptor and the packet has a TCP timestamp option field, the fast path module 324 saves the TSVal as the last TSVal from the acceptor in the session state storage 312 if the current packet's TSVal is higher than the TSVal in the session state storage 312.

The TSval of the TCP SYN packet that is to be sent to the service chain may be mapped to the last TSVal sent from the initiator.

The TSval of the TCP SYN-ACK packet that is to be sent to the service chain may be mapped the last TSVal sent from the acceptor. In addition, the SYN-ACK packet's TSecr should be the timestamp of the connection's last packet from the service chain.

Figure 27:
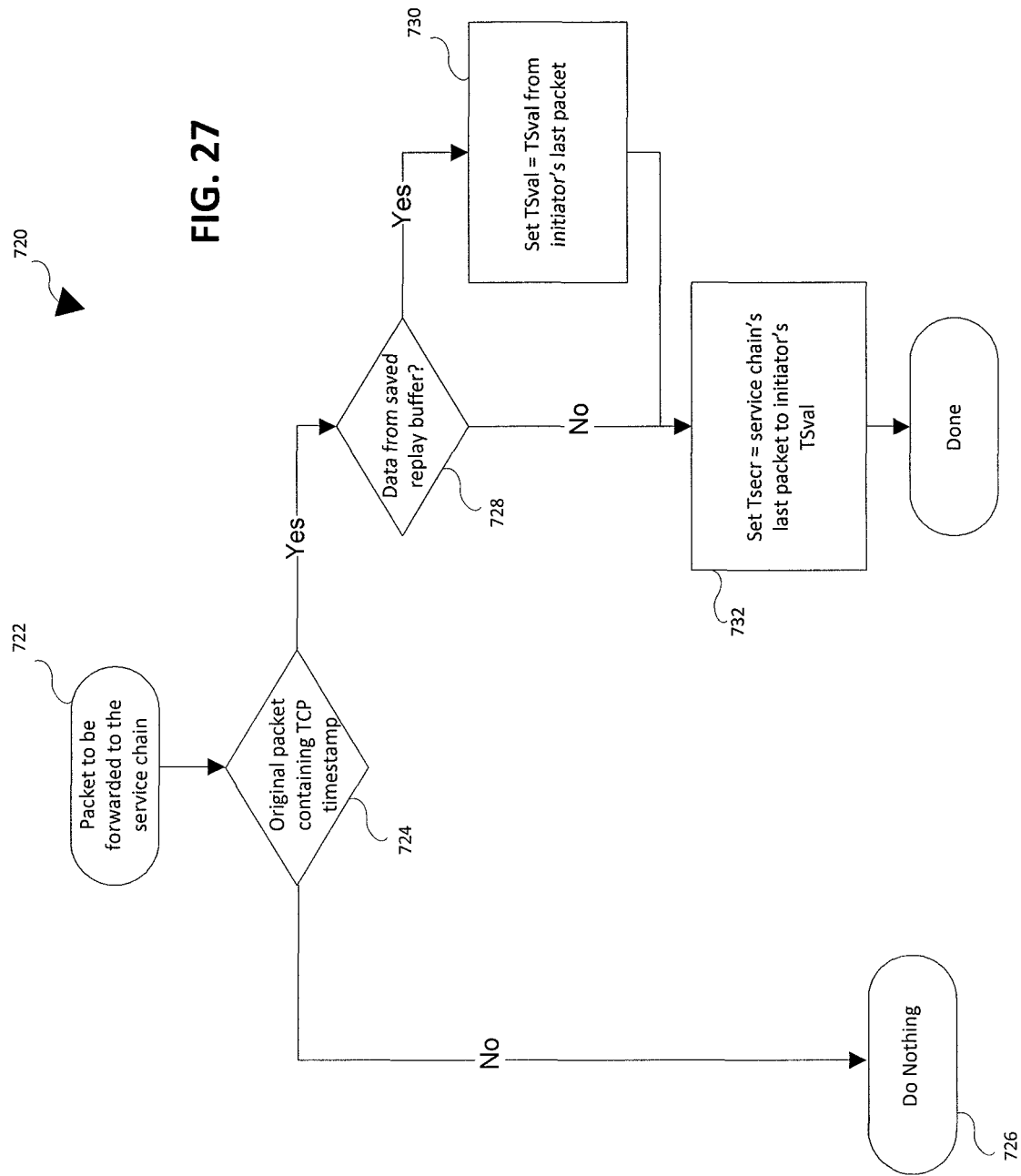
FIG. 27 is a flow chart of an embodiment of a method for TCP timestamp remapping for a packet originating from the initiator to the service chain.

For subsequent packets, non TCP SYN packets from the initiator, the system 302 will set the packet's TSecr to the TSVal of the last packet from the service chain to the initiator. For example, if the last packet from the service chain that is destined to the initiator has a TSVal of 123, the system 302 diverts a packet from the initiator to the service chain, divert chain manager 320 is configured to set that packet's TSecr to 123. For packet where data is from saved replay buffer, TSVal should be the initiator's last packet's TSVal. FIG. 27 illustrates an embodiment of a method 720 for TCP timestamp remapping for a packet originating from the initiator. The timestamp value may be based on the time the TCP packet is sent from the initiator, acceptor, or divert chain element. This value cannot be simply recalculated by the data length or number of packets and the TCP communication start time. As such, the method 720 details a TCP timestamp for remapping adapted to remap the timestamp for the packet.

At 722, packets are received from the initiator and are to be forwarded to the service chain. At 724, the fast path module 324 the packet contains a TCP timestamp. At 726, if the packet has no timestamp, the method may be aborted.

At 728, as the packet contains a TCP timestamp, the system determines whether the data of the packet is from the saved replay buffer. At 730, if the data is from the replay buffer, the TSVal is updated by the fast path module 324 with the TSVal from the initiator's last received packet. At 732, the fast path module 324 may modify the packet's TSecr to be in an acceptable range for the devices, such as the at least one divert host, in the service chain.

Subsequent packets from acceptor should have the TSecr set to the service chain's last packet to acceptor's TSVal. For packet where data is from saved replay buffer, the TSVal should be the acceptor's last packet's TSVal.

Figure 28:
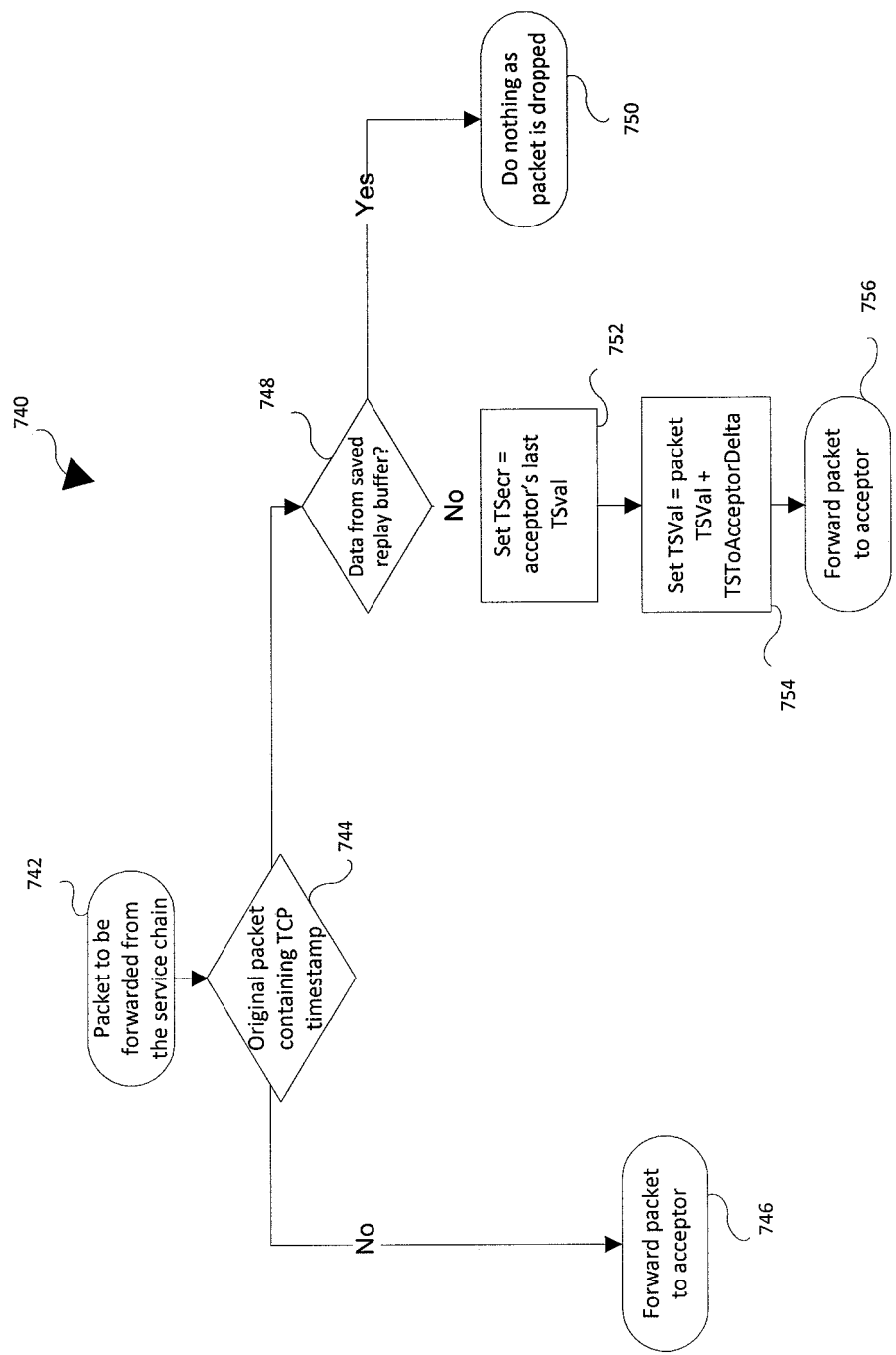
FIG. 28 is a flow chart of an embodiment of a method for TCP timestamp remapping for a packet originating from the service chain to the acceptor.

FIG. 28 illustrates an embodiment of a method 740 for TCP timestamp remapping for a packet originating from the service chain in the direction of the acceptor. At 742, the packet is received by the fast path module 324. At 744, the system 302 determines whether the packet contains a timestamp. At 746, the packet may be forwarded to the acceptor without modification if there is no TCP timestamp.

At 748, the divert chain manager 320 determines whether the data in the packet corresponds to the data in the replay buffer. At 750, if the data is equivalent, the packet may be dropped as the data has previously been received by the endpoint.

At 752, when all the data has been replayed, the fast path module 324 is configured to set the TSecr to the acceptor's last TSval. At 754, the system sets the TSVal to equal the packet's TSVal+TSToAcceptorDelta. TSToAcceptorDelta is saved connection state and is computed:
- at the moment of transition from REPLAY to FULL_DIVERTED state in case of the full divert; or
- at the moment of transition from REPLAY to HALF_DIVERTED state in the case of half divert.

TSToAcceptorDelta=(the TSVal of the last packet from initiator)−(the TSVal of service chain's last packet to acceptor).

At 756, the packet is forwarded to the initiator with the modified timestamp values.

Figure 29:
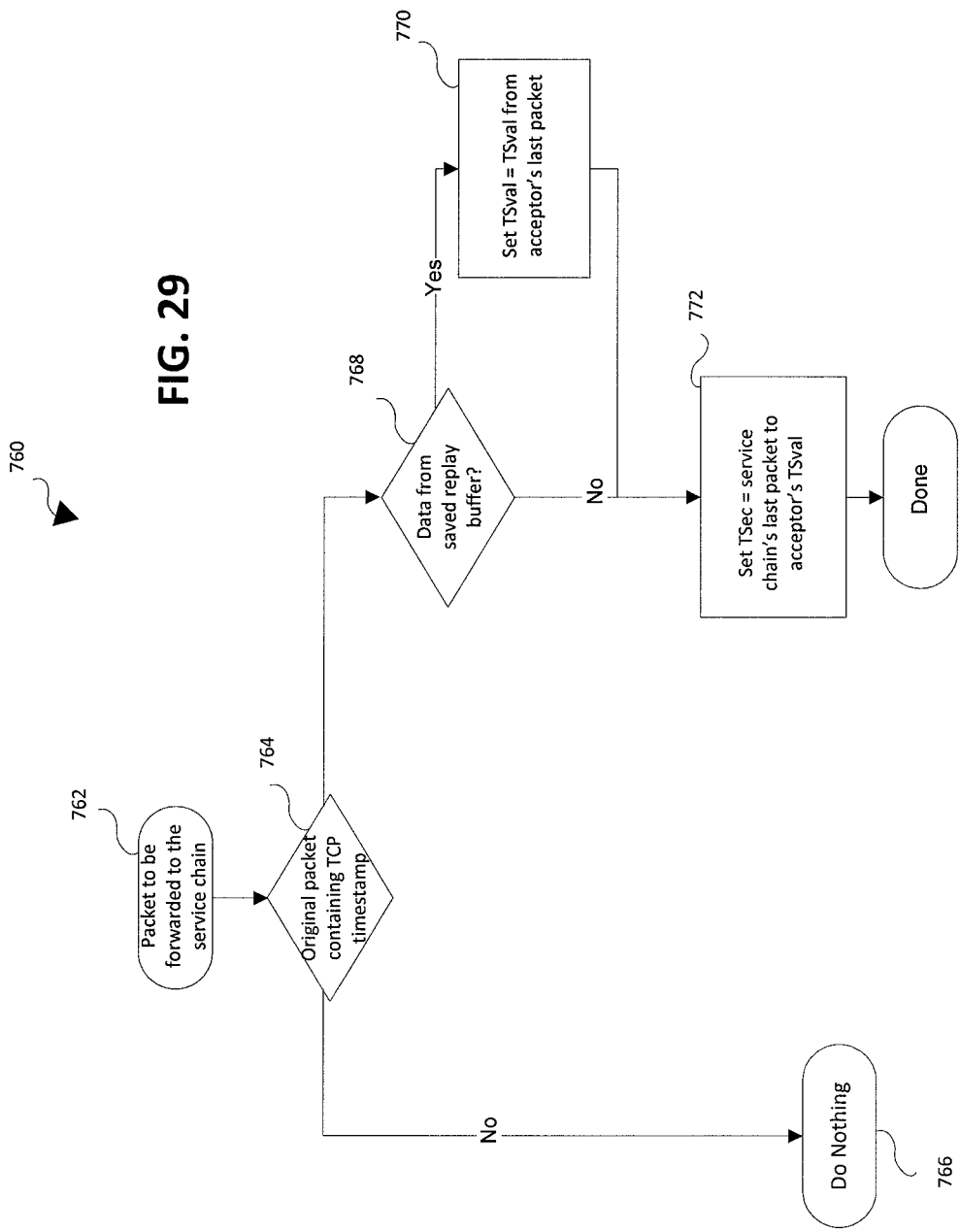
FIG. 29 is a flow chart of an embodiment of a method for TCP timestamp remapping for a packet originating from a acceptor to the service chain.

FIG. 29 illustrates a flow chart of an embodiment of a method 760 for TCP timestamp remapping for a packet originating from the acceptor and directed to the service chain.

At 762, packets are received from the acceptor and are to be forwarded to the service chain. At 764, the fast path module 324 determines whether the packet contains a TCP timestamp. At 766, if the packet has no timestamp, the method for TCP timestamp remapping may be aborted.

At 768, as the packet contains a TCP timestamp, it is determined whether the data of the packet is from the saved replay buffer. At 770, if the data is from the replay buffer, the TSVal is updated with the TSVal from the acceptor's last received packet. At 772, the TSecr is set to the TSval saved from the service chain's last packet to the acceptor.

Figure 30:
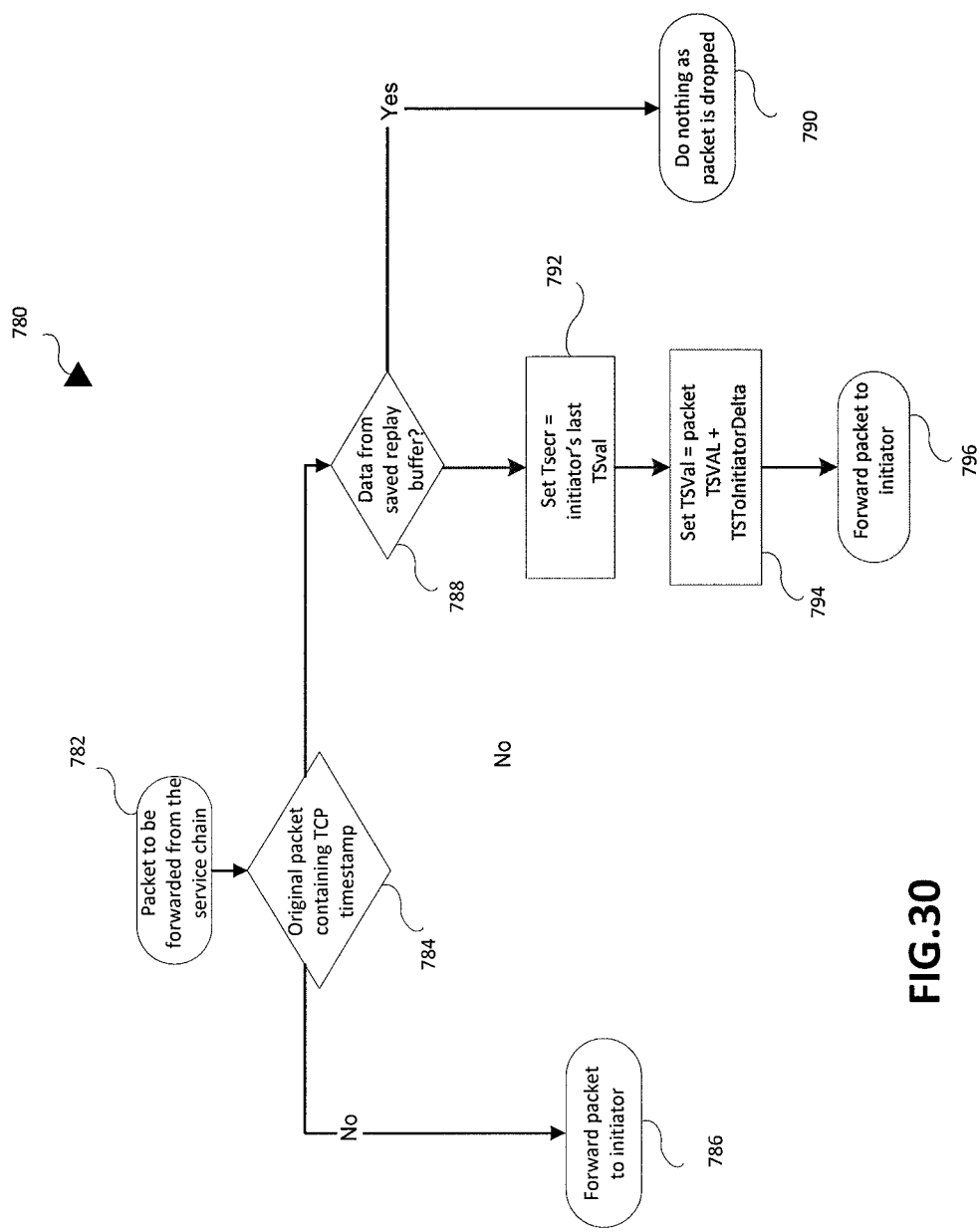
FIG. 30 is a flow chart of an embodiment of a method for TCP timestamp remapping for a packet originating from the service chain to the initiator.

FIG. 30 illustrates an embodiment of a method 780 for TCP timestamp remapping for a packet originating from the service chain in the direction of the initiator. At 782, the packet is received by the system. At 784, the system determines whether the packet contains a timestamp. At 786, the packet may be forwarded to the initiator without modification if there is no TCP timestamp.

At 788, the system 302 determines whether the data contained in the packet corresponds to the data in the replay buffer. At 790, if the data is equivalent, the packet may be dropped as the data has previously been received by the initiator endpoint.

At 792, when all the data has been replayed, the system is configured to set the TSecr to the initiator's last TSval. At 794, the TSVal is set to equal the packet's TSVal+TSToInitiatorDelta. TSToInitiatorDelta is defined as at:
- the moment of transition from REPLAY to FULL_DIVERTED state in case of the full divert; or
- the moment of transition from REPLAY to HALF_DIVERTED state in the case of half divert.

TSToInitiatorDelta=(the TSVal of the last packet
from acceptor)−(the TSVal of service chain's
last packet to initiator).

At 796; the packet is forwarded to the initiator with the modified timestamp.

In other embodiments there is provided a method for diverting for UDP packets to service chains after some content has been exchanged between the initiator and acceptor. The method for diverting UDP packets is generally similar to the method for diverting TCP connections except for, for example, the following difference:

i. There may be no AWAIT_SYN state or, AWAIT_SYN_ACK state for full divert and there may be no AWAIT_SYN_ACK state for half divert. Instead, the connection may proceed from the PRE_DIVERT_DECISION state to the REPLAY state as there is no handshake requirement for UDP connections;

ii. In half divert configuration, when connection transitions from REPLAY to HALF_DIVERT state, the system may not send an RST packet to the acceptor or server, as there is no RST flag for UDP packets;

iii. When replaying packets to the divert host, the system does not need to concern divert host acknowledging the replayed packet; as UDP does not have sequence numbers or acknowledge numbers;

iv. When undivert UDP connection, the divert chain manager 320 does not send an RST packet to the divert host; and v. the system does not need to update or remap the TCP timestamp value and echo reply remapping for UDP connection, as the timestamp option is not available for UDP.

In another embodiment, there is provided a method for diverting traffic to a service chain where some packets have been forwarded to the other endpoint and where some packets may be larger than the service chain's maximum frame size. Each element in the service chain (including individual divert host as well as inter-connecting elements such as routers, switches, etc.) may have a physical limit as to the maximum frame size. If this maximum frame size is smaller than the packet's frame size as sent by the initiator or the acceptor, the packet may not be accepted by the service chain and the connection may be broken. As such, there exists a need for the system to modify (either by segmentation/fragmentation) packets to the service chain.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A method for diverting established communication sessions comprising:
under the control of one or more computer systems configured with executable instructions performable by at least one processor, receiving at least one packet from a communication session, via a network interface;
determining the state of the communication session, via a packet parsing module;
if the state of the communication session is diverted, bridging the at least one packet to a service chain, via a divert chain manager, wherein the divert chain manager is operatively connected to the at least one processor;
if the state of the communication session has been prohibited from being diverted, forwarding the at least one packet to an endpoint, via a fast path module; and
otherwise, if the state of the communication session is a state prior to the divert decision, saving, via a protocol recognition state storage, the at least one packet and determining whether the communication session is a candidate to be diverted to the service chain, via the divert chain manager, wherein determining whether the communication session is a candidate to be diverted to the service chain comprises:
establishing a connection with the service chain;
sending the at least one saved packet to the service chain;
receiving at least one response packet as a response from the service chain;
determining an offset of the at least one response packet associated with the application layer content;
determining whether the at least one response packet has had application layer content identical to or has been modified by the service chain when compared to the at least one saved packet based in part on the offset of the at least one response packet;
if the at least one response packet has been modified, prohibit the communication session from being diverted; and
if the at least one response packet is identical, divert the communication session to the service chain.

2. The method of claim 1 wherein receiving the at least one packet comprises receiving initial set-up packets for the communication session as well as at least one data packet related to the communication session.

3. The method of claim 1 wherein the communication session is a UDP communication session.

4. The method of claim 1 wherein the communication session is a TCP communication session.

5. The method of claim 4 further comprising:

determining whether the at least one packet from the communication session has a timestamp option enabled;

if the timestamp option is enabled, saving a timestamp value and associating the timestamp value to an endpoint; and mapping a timestamp for the at least one packet received from the service chain to an associated timestamp value of the associated endpoint.

6. The method of claim 1 further comprising:

determining a maximum frame size associated with a packet that can be received by the service chain;

determining a frame size of the at least one packet; and if the frame size of the at least one packet is greater than the maximum frame size, fragmenting the at least one packet prior to bridging the packet to the service chain.

7. The method of claim 1 further comprising:

establishing a timeout timer with a predetermined threshold timeout time;

starting the timeout timer after sending the at least one packet to the service chain;

determining whether a response is received from the service chain prior to the timer reaching the predetermined threshold timeout time; and if no response is received, ending the connection to the service chain and prohibiting the communication session from being diverted.

8. The method of claim 1 wherein diverting the communication session to the service chain further comprises ending the communication session with an endpoint.

9. The method of claim 1 wherein if the response packet has not been modified, determining whether the saved packed has been sent to an endpoint and if the saved packet has been sent, not forwarding the response packet to the endpoint.

10. A system for diverting established communication sessions comprising:

one or more processors a memory comprising one or more modules executable by the one or more processors, the one or more modules comprising:

a network interface configured to receive at least one packet from a communication session;

a packet parsing module configured to determine the state of the communication session;

a divert chain manager configured to bridge the at least one packet to a service chain if the state of the communication session is diverted, bridging the at least one packet to a service chain;

a fast path module configured to forward the at least one packet to an endpoint, if the state of the communication session has been prohibited from being diverted, forwarding the at least one packet to an endpoint; and a protocol recognition state storage configured to save the at least one packet and determining whether the communication session is a candidate to be diverted to the service chain, if the state of the communication session is a state prior to the divert decision, and wherein the divert chain manager is further configured to:

establish a connection with the service chain;

send the at least one saved packet to the service chain;

receive at least one response packet as a response from the service chain;

determining an offset of the at least one response packet associated with the application layer content;

determine whether the at least one response packet has had application layer content identical to or has been modified by the service chain when compared to the at least one saved packet_based in part on the offset of the at least one response packet;

if the at least one response packet has been modified, prohibit the communication session from being diverted; and if the at least one response packet is identical, divert the communication session to the service chain.

11. The system of claim 10 wherein the network interface is further configured to receive initial set-up packets for the communication session as well as at least one data packet related to the communication session.

12. The system of claim 10 wherein the communication session is a UDP communication session.

13. The system of claim 10 wherein the communication session is a TCP communication session.

14. The system of claim 13 wherein the divert chain manager is further configured to:

determine whether the at least one packet from the communication session has a timestamp option enabled;

if the timestamp option is enabled, save a timestamp value and associating the timestamp value to an endpoint; and map a timestamp for the at least one packet received from the service chain to an associated timestamp value of the associated endpoint.

15. The system of claim 10 wherein the packet parsing module and divert chain manager are further configured to:

determine a maximum frame size associated with a packet that can be received by the service chain;

determine a frame size of the at least one packet; and if the frame size of the at least one packet is greater than the maximum frame size, fragment the at least one packet prior to bridging the packet to the service chain.

16. The system of claim 10 wherein the divert chain manager is further configured to:

establish a timeout timer with a predetermined threshold timeout time;

start the timeout timer after sending the at least one packet to the service chain;

determine whether a response is received from the service chain prior to the timer reaching the predetermined threshold timeout time; and if no response is received, end the connection to the service chain and prohibiting the communication session from being diverted.

17. The system of claim 10 wherein the divert chain manager is further configured to end the communication session with an endpoint.

18. The system of claim 10 wherein the divert chain manager is further configured to determine whether the saved packet has been sent to an endpoint and if the response packet has not been modified and the saved packet has been sent, not forwarding the response packet to the endpoint.

* * * * *